United States Patent [19]
Ochiai

[11] Patent Number: 5,748,458
[45] Date of Patent: May 5, 1998

[54] AC/DC CONVERTER POWER SUPPLY CIRCUIT HAVING MULTIPLE RECTIFIERS

[75] Inventor: Masashi Ochiai, Saitama-ken, Japan

[73] Assignee: Kabushiki Kaisha Toshiba, Kawasaki, Japan

[21] Appl. No.: 599,262

[22] Filed: Feb. 9, 1996

[30] Foreign Application Priority Data

Feb. 10, 1995 [JP] Japan .................. 7-023031
Mar. 9, 1995 [JP] Japan .................. 7-049944

[51] Int. Cl.$^6$ .................. H02M 3/335; H02M 7/5387
[52] U.S. Cl. .................. 363/17; 363/132
[58] Field of Search .................. 363/15, 16, 17, 363/40, 47, 131, 132, 95

[56] References Cited

U.S. PATENT DOCUMENTS 4,347,558  8/1982  Kalinsky .................. 363/17
5,343,378  8/1994  Tohya .................. 363/40

*Primary Examiner*—Peter S. Wong
*Assistant Examiner*—Bao Q. Vu
*Attorney, Agent, or Firm*—Cushman Darby & Cushman IP Group of Pillsbury Madison & Sutro LLP

[57] ABSTRACT

An AC/DC converter power supply circuit includes an AC power supply source, a first rectifier for full-wave rectifying the AC power supply source voltage, a second rectifier for further rectifying and smoothing the voltage rectified by the first rectifier, a DC/DC converter for obtaining a desired rectified and smoothed DC voltage after converting the DC voltage rectified and smoothed in the second rectifier into a second AC voltage by a high frequency inverter, and an adder for adding the second AC voltage generated in the high frequency inverter in the DC/DC converter to the full-wave rectifier voltage from the first rectifier circuit.

17 Claims, 13 Drawing Sheets

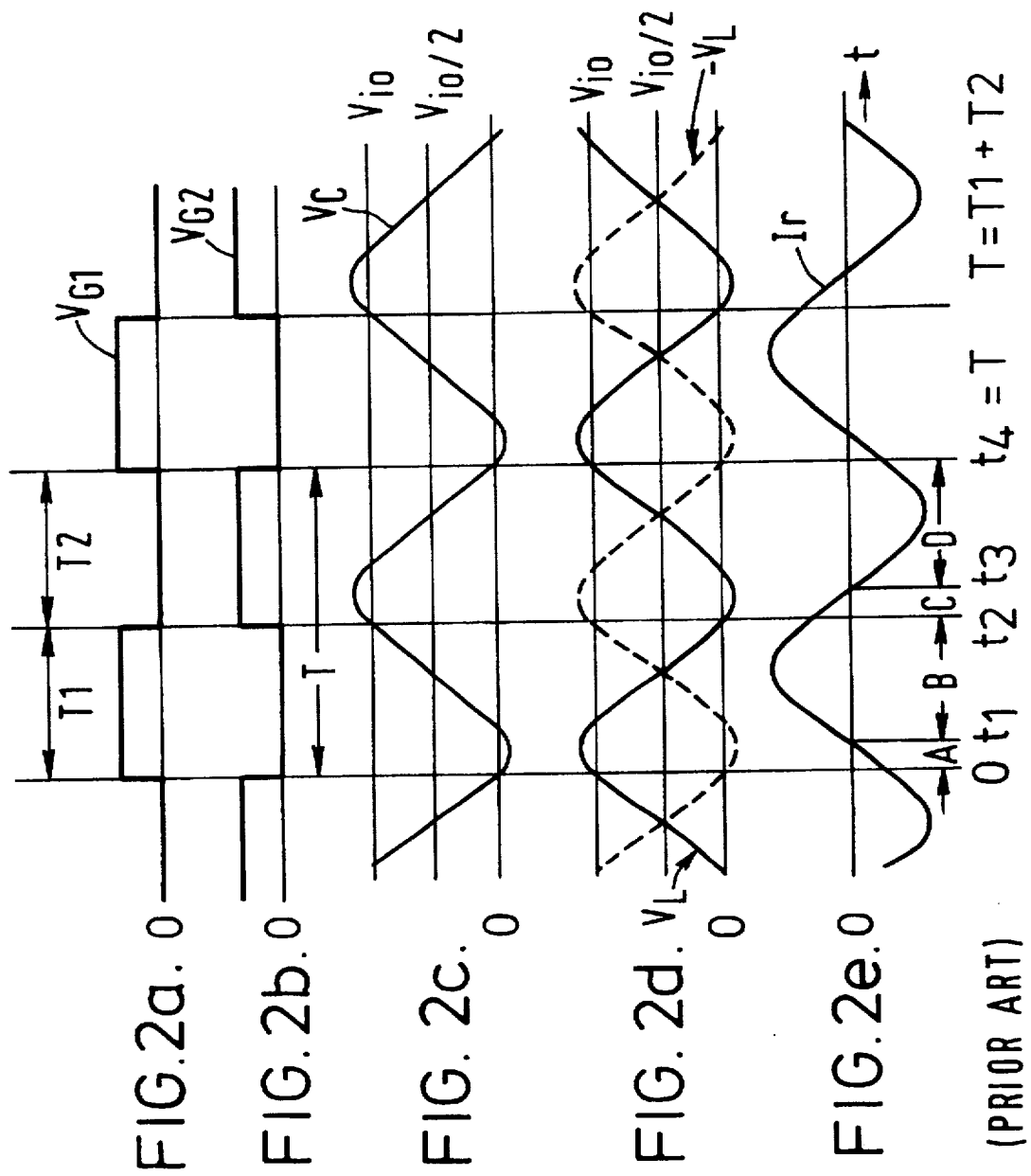

PERIOD A: 0~t1

PERIOD B: t1~t2

PERIOD C: t2~t3

PERIOD D: t3~t4

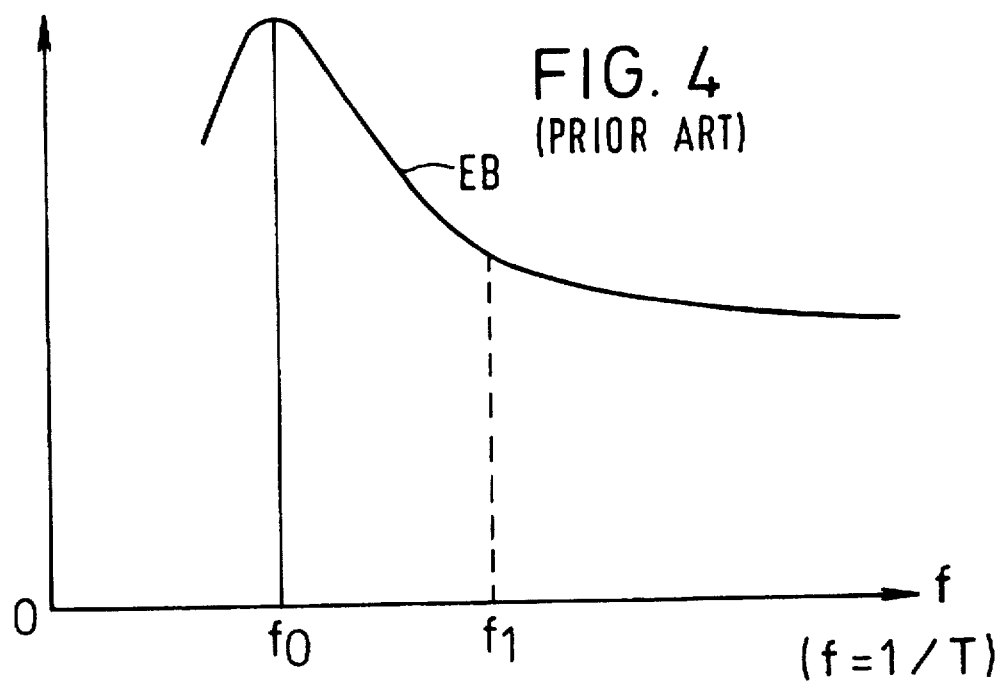
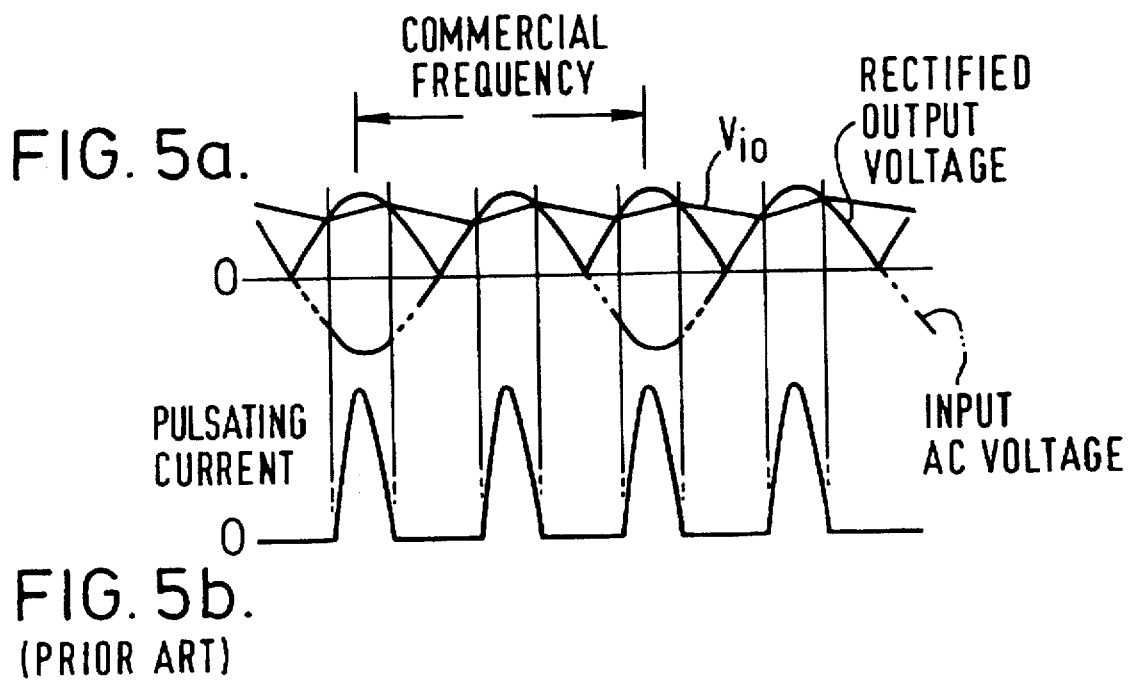

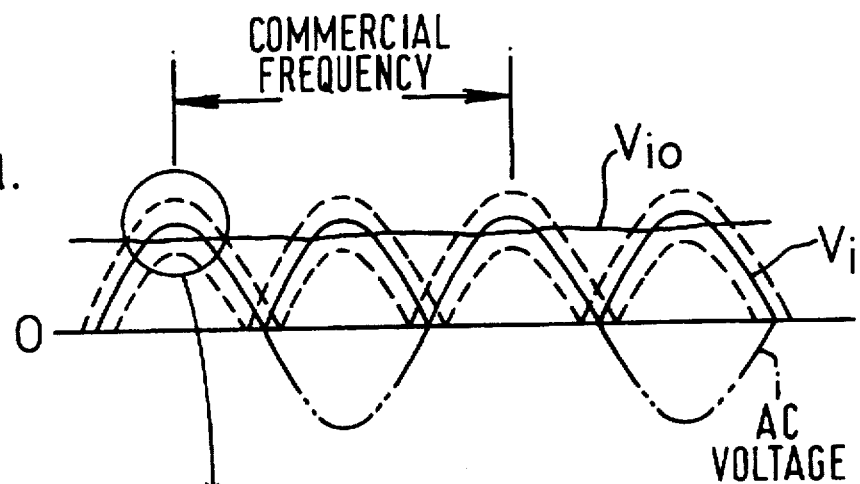
FIG. 7a.
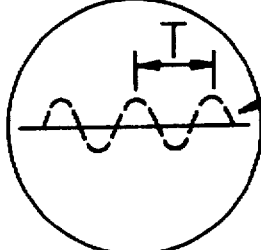
FIG. 7b.
PARTIAL ENLARGED VIEW
$T = 1/f$
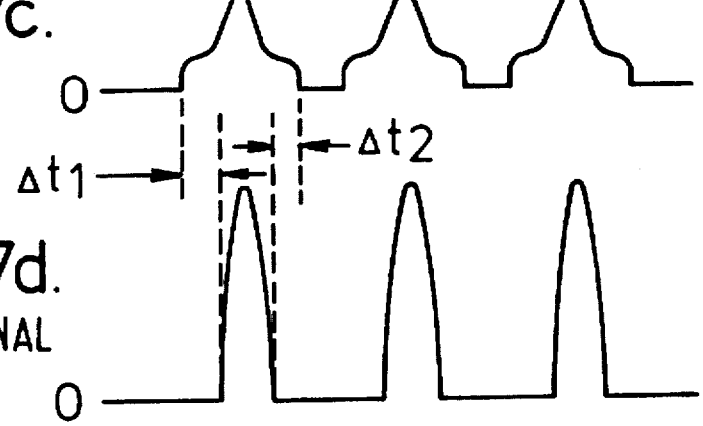
FIG. 7c.
PRESENT INVENTION'S CASE
FIG. 7d.
CONVENTIONAL CASE

PARTIAL ENLARGED VIEW $T = 1/f$

PRESENT INVENTION'S CASE

CONVENTIONAL CASE

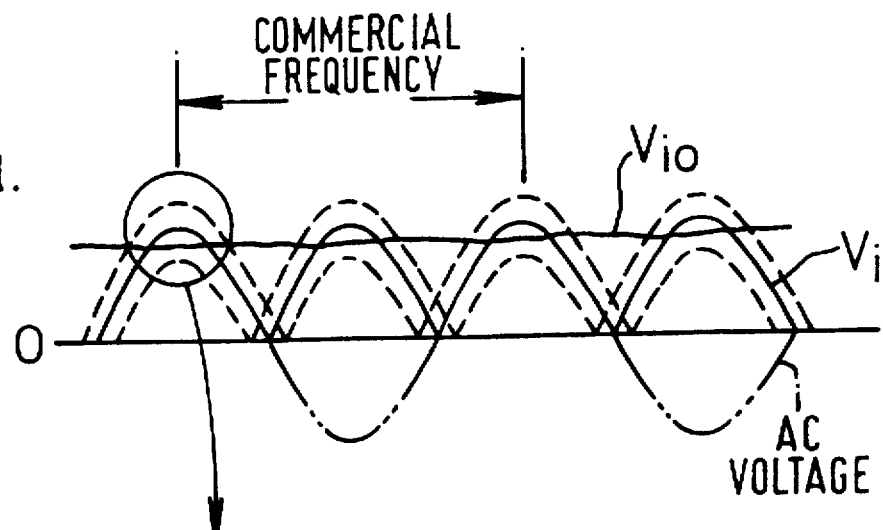
FIG. 11a.
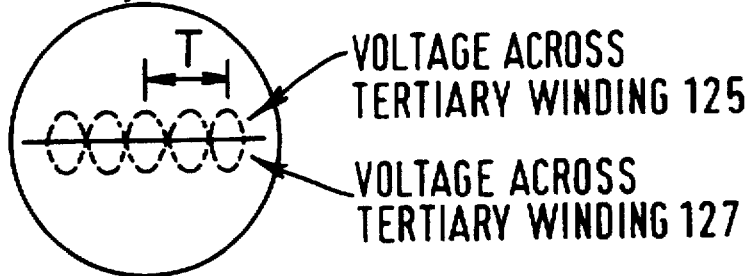
FIG. 11b.
PARTIAL ENLARGED VIEW
$T = 1/f$
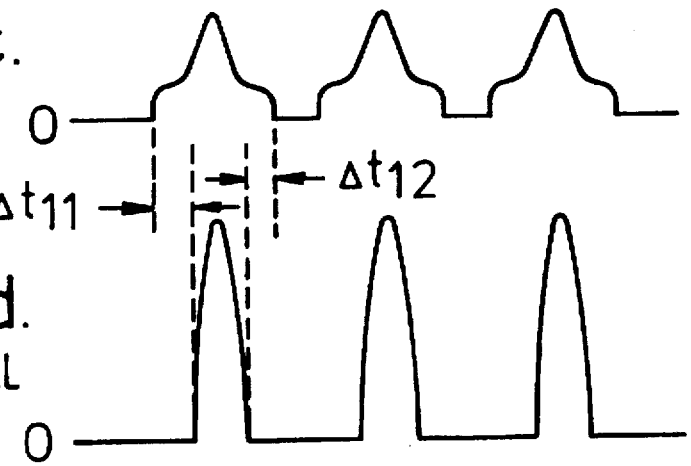
FIG. 11c.
PRESENT INVENTION'S CASE
FIG. 11d.
CONVENTIONAL CASE

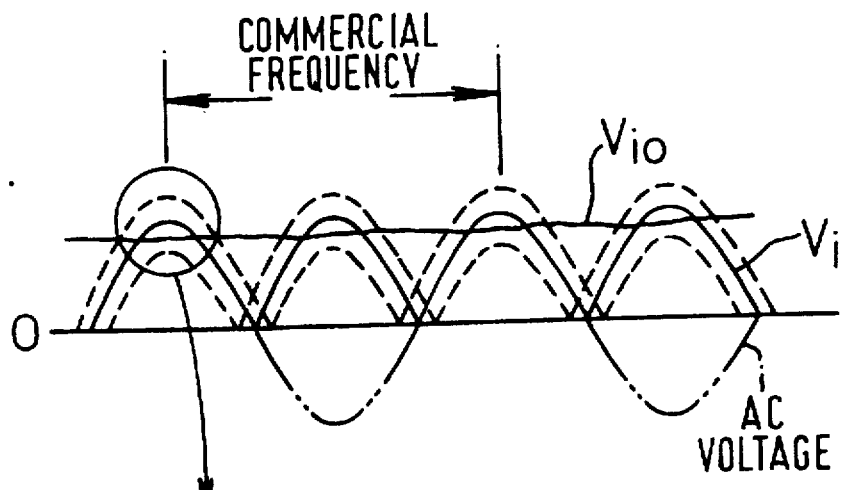
FIG. 13a.
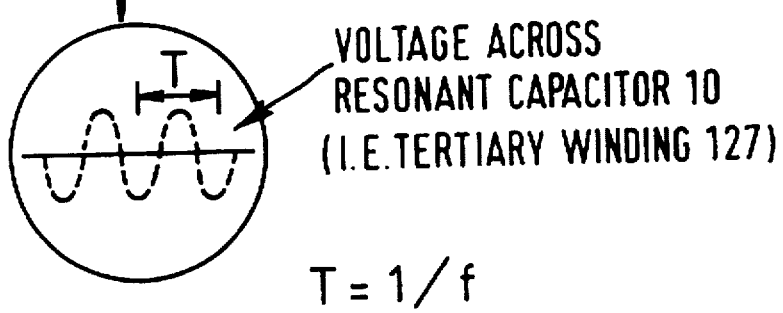
FIG. 13b.
PARTIAL ENLARGED VIEW
$T = 1/f$
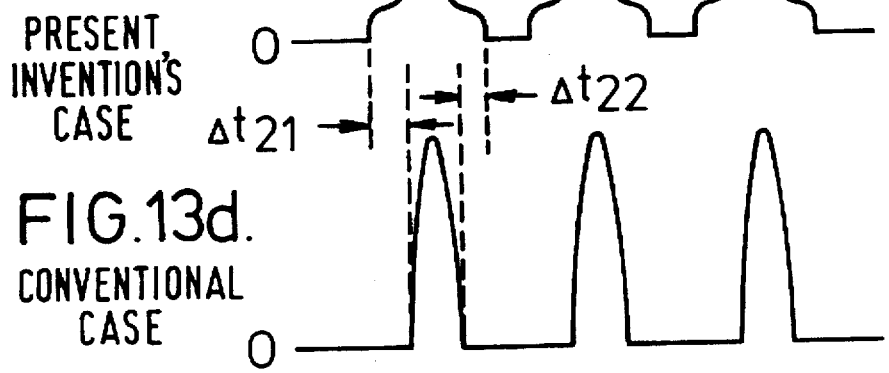
FIG. 13c.
PRESENT INVENTION'S CASE
FIG. 13d.
CONVENTIONAL CASE

AC/DC CONVERTER POWER SUPPLY CIRCUIT HAVING MULTIPLE RECTIFIERS

FIELD OF THE INVENTION

The present invention relates to an AC/DC converter power supply circuit for use in an electronic apparatus, such as a television receiver, and more particularly, to a circuit for improving the power factor of an AC/DC converter power supply circuit.

BACKGROUND OF THE INVENTION

Recent electronic devices have had increased efficiency, miniaturization and light weight by using IC techniques. However, a power supply device for use with such electronic devices also require similar characteristics of high efficiency, miniaturization and light weight. For a regulated power supply which satisfies these requirements, there is a power supply source circuit adopting a switching system.

A regulated DC voltage circuit requiring the switching system changes its conductive period by turning ON/OFF the input DC power supply voltage using a high speed switching element such as a transistor. The DC voltage circuit also controls the output DC voltage constantly by changing the ON/OFF cycle.

While the switching power supply circuit adopts various systems, the power supply circuit in the DC/DC converter system using a high frequency inverter will be explained hereinafter.

FIG. 1 shows a circuit diagram of a conventional AC/DC converter power supply circuit.

In FIG. 1 the power supply voltage from a commercial AC power supply source 1 is full-wave rectified by the diode bridge rectifier circuit 2, smoothed by the smoothing capacitor 3 and supplied to the DC/DC converter 30.

The DC/DC converter 30 has MOSFETs 4, 5 connected in series for use as first and second switching elements between the positive output terminal of the smoothing capacitor 3 and a reference potential source. Further, diodes 6, 7 are connected in parallel to the MOSFETs 4, 5 such that the diode current flows in the opposite direction to the switching current of the MOSFETs 4, 5. That is, the cathode and the anode of the diode 6 are connected to the drain and source of the MOSFET 4, respectively while the cathode and the anode of the diode 7 are connected to the drain and the source of the MOSFET 5, respectively. A gate pulse for alternately turning ON/OFF the MOSFETs 4, 5 is supplied from a control circuit 23 to the gates of the MOSFETs 4, 5. A series circuit containing a primary winding 9 of the transformer 8 and a resonant capacitor 10 is connected to the coupling node of the first parallel circuit, which comprises the MOSFET 4 and the diode 6, and the second parallel circuit, which comprises the MOSFET 5 and the diode 7. The series circuit is also connected to the reference potential source, and a predetermined AC voltage is output from the secondary winding 11 of the transformer 8. The first parallel circuit comprising the MOSFET 4 and the diode 6, the second parallel circuit comprising the MOSFET 5 and the diode 7, a series circuit comprising the primary winding 9, and the resonant capacitor 10 and the control circuit 23 compose the half-bridge type high frequency inverter for converting the DC voltage into an AC voltage.

One end of the secondary winding 11 of the transformer 8 is connected to a DC voltage output terminal 15 via a rectifier diode 12, and the other end of the secondary winding 11 is connected to the DC voltage output terminal 15 via a rectifier diode 13. The shunt of the secondary winding 11 is connected to the reference potential source. A smoothing capacitor 14 is connected between the coupling node of the cathodes of diodes 12, 13 and the reference potential source. The secondary winding 11, the rectifier diodes 12 and 13, and the ground line connected to the shunt of the secondary winding 11 comprise a full-wave rectifier on the secondary side of the transformer 8.

A DC voltage EB from the DC voltage output terminal 15 is supplied to an error amplifier 17 via a resistor 16. The DC voltage EB is compared with a reference value and amplified in the error amplifier 17. According to an error voltage output of the error amplifier 17, a current flows into a resistor 18 and a light emitting diode 20 connected in series. An error signal is transmitted to a light sensing transistor 21 by using a photo coupler 19 comprising the light emitting diode 20 and the light sensing transistor 21. The error signal is then returned to a control circuit 23 as an control signal via a resistor 22. The control circuit 23 for controlling the ON/OFF of the first and the second switching elements, such as the MOSFETs 4, 5, alternately changes the frequency of the gate pulse supplied to the MOSFETs 4, 5 by the feedback control signal and controls the ON/OFF cycle of the MOSFETs 4, 5 to stabilize the output voltage EB.

Next, the operation of the circuit in FIG. 1 will be explained with reference to FIGS. 2 and 3.

FIG. 2-a through 2-e show the waveforms of the voltage and the current in the DC/DC converter 30 in FIG. 1.

VG1 and VG2 as shown in FIGS. 2-a, 2-b denote the gate pulses of the MOSFETs 4, 5. VC in FIG. 2-c denotes a sine-wave voltage (resonant voltage) across the resonant capacitor 10. VL in FIG. 2-d denotes a sine-wave voltage (resonant voltage) across the primary winding 9 of the transformer 30. The voltage ViO as shown in FIGS. 2-c and 2-d is obtained through full-wave rectification by the diode bridge rectifier circuit 2 and smoothing by the smoothing capacitor 3. Ir in FIG. 2-e denotes a sine-wave current flowing through the primary winding 9 and the resonant capacitor 10. The direction indicated by the arrow in FIG. 1 is a positive direction of the current Ir.

FIGS. 3-a through 3-d illustrate the operation of one cycle period of the sine-wave current Ir.

As shown in FIG. 2-b, when time t=0 and the gate pulse VG2 to the MOSFET 5 disappears, the MOSFET 5 is turned OFF. At the period D just before time t=0 (the period equivalent to t=t3-t4 in FIG. 2), the current Ir which flows from the resonant capacitor 10 to the MOSFET 5 through the primary winding 9 of the transformer 8 flows due to an electric charge stored in the resonant capacitor 10. Ir flows for the period A (the period of t=0-t1: the first damper period) as shown in FIG. 3-a through a first diode 6 by discharging the energy stored in the primary winding 9 when t=0. The current Ir is a sine-wave current, as shown as in FIG. 2-e, when the load connected to the secondary side of the transformer 8 is zero. Since the gate pulse VG1 has already been supplied to the MOSFET 4 after t=0 when the time goes to t1, the first diode is turned OFF and the current Ir flows from the DC power supply via the MOSFET 4 in the positive direction for the period B (t=t1-t2), as shown in FIG. 3-b. Next, when the time becomes t2, the gate pulse VG1 disappears, the MOSFET 4 is turned OFF, and the current Ir continues flowing from the winding 9 to the capacitor 10 via the second diode 7 in the positive direction for the period C (t=t2-t3: the second damper period) as shown in FIG. 3-c. Since the gate pulse VG2 has already been supplied to MOSFET 5 and MOSFET 4 is turned OFF after time t2 when the time goes to t3, the second diode 7 is turned OFF, and the current Ir flows via winding 9 and the MOSFET 5 in the negative direction based on an electronic charge in the capacitor 10 as shown for the period D (t=t3–t4) as shown in FIG. 3-d. When the time becomes t4, the gate pulse VG2 to MOSFET 5 disappears and the operation of the current Ir returns to the operation of time t=O.

The foregoing is an explanation of the operation of the switching elements 4, 5, the primary winding 9 and the resonant capacitor 10 in one cycle period. Since the width of the gate pulses t1 and t2 are set equally (see FIG. 2) the MOSFET 4 the MOSFET 5, the first diode 6 and the second diode 7 repeat the ON/OFF operations with the same conducting period. Also, the power which is needed for operation during the one cycle period is supplied to the primary winding 9 of the transformer 8 and the resonant capacitor 10 from the rectifier power supply source of the diode bridge rectifier circuit 2. That is, the power which will be consumed in every period is supplied by the rectifier power supply source. At this time, sine-wave voltages VL and VC having different phases from each other as shown in FIG. 2 are generated in the primary winding 9 of the transformer 8 and the resonant capacitor 10. In the secondary winding of the transformer 8, a sine-wave voltage which is proportional to the voltage in the primary winding 9 is generated according to the transformer turn ratio. The sine-wave voltage in the secondary winding 8 is full-wave rectified by the rectifier diodes 12, 13 and the smoothing capacitor 14 and then is supplied to the load (not shown) as an output DC voltage EB.

FIG. 4 shows the controlling characteristic of the output DC voltage EB of the AC/DC converter power supply circuit. The switching frequency f of the switching elements (here, MOSFETS 4, 5) is shown in the horizontal axis and the output DC voltage EB is shown in the vertical axis. The output DC voltage EB is controlled by changing the switching frequencies f of the MOSFETs 4, 5 and the frequencies of the gate pulses VG1 and VG2 to a resonant frequency f which is dependent on the primary winding 9 and the value of the resonant capacitor 10. For instance, when the MOSFETs 4, 5 operate at the switching frequency f, the load current increases and the output DC voltage EB decreases. The error voltage is returned to the primary control circuit from an error amplifier 17 through the photo coupler 19 to reduce the switching frequency f of the MOSFETs 4, 5 and to increase the output voltage EB automatically.

FIG. 5 shows the operation of the diode bridge rectifier circuit 2 in the AC/DC converter power supply circuit. The smoothing capacitor 3 is connected to the output of the diode bridge rectifier circuit 2 as shown in FIG. 1, and the power supply source voltage from the AC power supply source 1 is full-wave rectified by the diode bridge rectifier circuit 2 and smoothed by the smoothing capacitor 3. So, as shown by the voltage waveform in FIG. 5-a, a power supply source ripple voltage (ViO fluctuation) contained in the smoothed voltage ViO and the rectifier output voltage is very small, and the conducting period of the diode bridge rectifier circuit 2 for a period of the power supply source frequency is extremely short. In other words, the rectified current flowing in the power supply line flows only when the full-wave rectifier output voltage in the diode bridge rectifier circuit 2 exceeds the voltage across the smoothing capacitor 3. The rectified current becomes a pulsating current, as shown in FIG. 5-b, so that the width of the conductive period to one cycle period of the power supply frequency is kept narrow. However, there is a drawback that the power factor of the power supply source line can be as low as 0.6, and harmonic waves contained in the pulsating current are large.

To overcome the problem, if the capacity of the smoothing capacitor 3 is reduced, the conducting period of the diode bridge rectifier circuit 2 is extended, and the power factor also increases while the harmonic waves contained in the pulsating current decreases. However, since the smoothness (an integral effect) by the smoothing capacitor 3 increases and the ripple voltage has a frequency twice as high as the commercial power supply voltage frequency contained in the output voltage EB, as seen in the full-wave rectifier waveform, the circuit fails to carry out its original function as a constant voltage circuit current t.

As described above, a conventional circuit had drawbacks in that the power factor of the power supply source line is low and the harmonic waves contained in the rectified current increases. On the other hand, if the capacitance of the smoothing capacitor decreases to improve the drawbacks mentioned above, the amount of ripple increases and the circuit fails to carry out its original function as a constant voltage circuit.

SUMMARY OF THE INVENTION

It is, therefore, an object of the present invention to provide an AC/DC converter power supply circuit that is capable of increasing the power factor of the AC power supply line, decreasing the harmonic waves contained in the rectified current, and performing as a constant voltage circuit.

In order to achieve the above object, an AC/DC converter power supply circuit according to a first aspect of the present invention includes:

an AC power supply source;

a first rectifier for full-wave rectifying the AC power supply source voltage;

a second rectifier for further rectifying and smoothing the voltage rectified by the first rectifier;

a DC/DC converter for obtaining a desired rectified and smoothed DC voltage after converting the DC voltage rectified and smoothed in the second rectifier into a second AC voltage by a high frequency inverter; and means for adding the second AC voltage generated in the high frequency inverter in the DC/DC converter to the full-wave rectifier voltage from the first rectifier circuit.

Further to the first aspect of the invention, an AC/DC converter power supply circuit according to a second aspect of the present invention still includes:

a first parallel circuit which is comprised of a first diode connected in parallel with a first switching element with a polarity where a current flows in the opposite direction to a switching current of a first switching element, and a DC voltage from the second rectifier is supplied to the coupling node of the first switching element and the cathode of the first diode;

a second parallel circuit which is comprised of a second diode connected in parallel with a second switching element with a polarity where a current flows in the opposite direction to a switching current of the second switching element, the coupling node of the second switching element and the cathode of the second diode being connected to the coupling node of the first switching element and the anode of the first diode, and the coupling node of the second switching element and the anode of the second diode being connected to a reference potential source;

a transformer having a primary winding connected between the coupling node of the first and second parallel circuits and the reference potential source through a resonant capacitor and a secondary winding for inducing a predetermined AC voltage;

a third rectifier for rectifying the AC voltage generated in the secondary winding of the transformer and then smoothing the rectified AC voltage; and a control circuit for alternately turning ON/OFF the first switching element and the second switching element.

According to a third aspect of the present invention, in the AC/DC converter power supply circuit according to the first aspect of the present invention, the first rectifier is comprised of a diode bridge rectifier circuit, and the second rectifier is comprised of a rectifier diode and a smoothing capacitor.

According to a fourth aspect of the present invention, in the AC/DC converter power supply circuit according to the first aspect of the present invention, the adding means is constituted by using a DC decoupling capacitor.

According to a fifth aspect of the present invention, in the AC/DC converter power supply circuit according to the second aspect of the present invention, the control circuit changes the ON and OFF cycle of the first and the second switching elements based on the voltage from which the DC voltage from the third rectifier is detected, and controls the DC voltage from the third rectifier constantly.

Also, in order to achieve the above object, an AC/DC converter power supply circuit according to a sixth aspect of the present invention includes:

An AC/DC converter power supply circuit according to a sixth aspect of the present invention is characterized by that it is provided with:

an AC power supply source;

a diode bridge rectifier circuit to which the AC power supply source voltage is supplied;

a low pass filter connected to the output of the diode bridge rectifier;

a second rectifier connected to the output of the low pass filter where an anode is also connected;

smoothing capacitor connected between the cathode of the second rectifier diode and the reference potential source;

a DC/DC converter for obtaining a desired rectified and smoothed DC voltage after converting the DC voltage smoothed in the smoothing capacitor into a second AC voltage by a high frequency inverter; and a DC decoupling capacitor for supplying the second AC voltage which is generated in the high frequency inverter of the DC/DC converter to the second rectifier diode.

Also, in order to achieve the above object, an AC/DC converter power supply circuit according to a seventh aspect of the present invention includes:

an AC power supply source;

a first rectifier for full-wave rectifying the AC power supply source voltage;

a second rectifier for further rectifying and smoothing the voltage rectified by the full-wave rectifier;

a DC/DC converter for obtaining a desired rectified and smoothed DC voltage after changing the DC voltage rectified and smoothed by the second rectifier circuit into a second AC voltage by a high frequency inverter, and changing the second AC voltage into the desired voltage by a transformer; and a winding connected between the first rectifier and the second rectifier circuit and wound to the transformer of the DC/DC converter for adding a voltage which is induced from the second AC voltage of the high frequency inverter to a full-wave rectifier voltage from the first rectifier circuit so as to supply it to the second rectifier.

Also, in order to achieve the above object, an AC/DC converter power supply circuit according to a eighth aspect of the present invention includes:

an AC power supply source;

a first rectifier for full-wave rectifying the AC power supply source voltage;

a second rectifier for further full-wave rectifying and smoothing the voltage rectified by the first rectifier;

a DC/DC converter for obtaining a desired rectified and smoothed DC voltage after changing the DC voltage rectified and smoothed by the second rectifier circuit into a second AC voltage by a high frequency inverter, and changing the second AC voltage into the desired voltage by a transformer; and first and second windings connected between the first rectifier and the second rectifier and wound in opposite phase directions with each other in the transformer of the DC/DC converter for adding the opposite phase AC voltages which are induced in the two windings according to the AC voltage of the high frequency inverter to a full-wave rectifier voltage from the first rectifier so as to supply them to a full-wave rectifier input terminal of the second rectifier circuit.

Also, in order to achieve the above object, an AC/DC converter power supply circuit according to a ninth aspect of the present invention includes:

an AC power supply source;

a first rectifier for full-wave rectifying the AC power supply source voltage;

a second rectifier for further rectifying and smoothing the voltage rectified by the full-wave rectifier;

a DC/DC converter for obtaining a desired rectified and smoothed DC voltage after changing the DC voltage rectified and smoothed by the second rectifier circuit into a second AC voltage by a high frequency inverter, and changing the second AC voltage into the desired voltage by a transformer;

a first adder containing a winding which is connected between the first rectifier and the second rectifier circuit and wound to the transformer of the DC/DC converter for adding the voltage induced in the winding based on the AC voltage of the high frequency inverter to the full-wave rectifier voltage from the first rectifier circuit; and a second adder for adding the AC voltage generated in the high frequency inverter of the DC/DC converter to the full-wave rectifier voltage from the first rectifier so that the phase of the AC voltage becomes as same as that of the added voltage in the first adder, Also, in order to achieve the above object, an AC/DC converter power supply circuit according to a 10th aspect of the present invention includes:

an AC power supply source;

a first rectifier for full-wave rectifying the AC power supply voltage;

a second rectifier circuit for further rectifying the voltage which is rectified by the first rectifier;

a smoothing circuit for smoothing the voltage of the second rectifier circuit;

a DC/DC converter for obtaining a desired rectified and smoothed DC voltage after changing the DC voltage obtained in the smoothing circuit into a second AC voltage by the high frequency inverter and changing it into a desired voltage in the transformer;

a first adder comprised of a winding which is connected between the second rectifier and the smoothing circuit and wound to the transformer of the DC/DC converter for adding a voltage induced in the winding according to the AC voltage of the high frequency inverter to the rectifier voltage from the second rectifier; and a second adder for adding the AC voltage generated in the high frequency inverter of the DC/DC converter to a full-wave rectifier voltage from the first rectifier so that the phase of the voltage becomes the same as that of the added voltage in the first adder.

Further to any one of the seventh through tenth aspects of the invention, an AC/DC converter power supply circuit according to a 11th aspect of the present invention still includes:

a first parallel circuit which is comprised of a first diode connected in parallel with a first switching element with a polarity where a current flows in the opposite direction to a switching current of a first switching element, wherein an AC voltage from the second rectifier is supplied to the coupling node of the first switching element and the cathode of the first diode;

a second parallel circuit which is comprised of a second diode connected in parallel with a second element with a polarity where a current flows in the opposite direction to a switching current of the second switching element, wherein the coupling node of the second switching element and the cathode of the second diode is connected to the coupling node of the first switching element and the anode of the first diode, and wherein the coupling node of the second switching element and the anode of the second diode is also connected to a reference potential source;

a transformer provided between the coupling node of the first and second parallel circuits and the reference potential source for outputting the specified AC voltage to the secondary winding, as it is connected to a series circuit of the primary winding and a resonant capacitor;

a third rectifier circuit for rectifying the AC voltage generated in the secondary winding of the transformer and smoothing the rectified AC voltage; and a control circuit for alternately turning ON/OFF the first switching element and the second switching element.

According to a 12th aspect of the present invention, in the AC/DC converter power supply circuit according to any one of the seventh through ninth aspects of the present invention, the first rectifier comprises a diode bridge rectifier circuit, and the second rectifier comprises a rectifier diode and a smoothing capacitor.

According to a 13th aspect of the present invention, in the AC/DC converter power supply circuit according to the tenth aspect of the present invention, the first rectifier comprises a diode bridge rectifier circuit, and the second rectifier comprises a rectifier diode.

According to a 14th aspect of the present invention, in the AC/DC converter power supply circuit according to the ninth or tenth aspect of the present invention, the second adder uses a DC decoupling capacitor.

According to a 15th aspect of the present invention, in the AC/DC converter power supply circuit according to the 11th aspect of the present invention, the control circuit changes the ON/OFF cycle of the first and the second switching elements according to the voltage from which the DC voltage from the third rectifier is detected, and controls the DC voltage from the third rectifier constantly.

Further to any one of the seventh through ninth aspects of the invention, an AC/DC converter power supply circuit according to a 16th aspect of the present invention includes a low pass filter between the first rectifier and the input terminal of the winding to the transformer for decoupling the high frequency components to flow into the first rectifier.

Further to any one of the 10th through 13th aspects of the invention, an AC/DC converter power supply circuit according to a 17th aspect of the present invention includes a low pass filter between the first rectifier and the second rectifier for decoupling the high frequency components to flow into the first rectifier.

According to the first, sixth and seventh aspects of the invention, it is possible to add the sine-wave voltage generated in the winding provided in the transformer in the DC/DC converter to the rectified output voltage obtained by full-wave rectifying the AC power supply voltage in the first rectifier, to further rectify and smooth the added voltage in the second rectifier so as to extend the width of the rectifier current in the power supply line, to increase a power factor and to reduce harmonic waves contained in the rectified current.

According to the eighth aspect of the invention, it is possible to add the sine-wave voltage generated in the winding provided in the transformer in the DC/DC converter to the rectified output voltage obtained by full-wave rectifying the AC power supply voltage in the first rectifier, to further rectify and smooth the added voltage in the second rectifier so as to extend the width and the amplitude of the rectifier current in the power supply line to further increase the power factor, and to reduce harmonic waves contained in the rectified current even further.

According to the ninth and tenth aspects of the invention, it is possible to add the first sine-wave voltage generated in the winding provided in the transformer in the DC/DC converter and the second sine-wave voltage having the same phase as that of the first sine-wave voltage generated in the high frequency inverter in the DC/DC converter to the rectified output voltage obtained by full-wave rectifying the AC power supply voltage in the first rectifier, to further rectify and smooth the added voltage so as to extend the width and the amplitude of the rectifier current in the power supply line to further increase the power factor, and to further reduce harmonic waves contained in the rectified current.

Additional objects and advantages of the present invention will be apparent to persons skilled in the art from a study of the following description and the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 2 is a diagram explaining the operation of a circuit which is common to the embodiment of the present invention and the conventional circuit;

FIG. 4 is a diagram explaining the operation of a circuit which is common to the embodiment of the present invention and the conventional circuit;

FIG. 5 is a diagram showing the operation of the conventional circuit as shown in FIG. 1;

FIG. 7 is a waveform diagram explaining the circuit operation shown in FIG. 6;

FIG. 11 is a waveform diagram showing a circuit operation as shown in FIG. 10;

FIG. 13 is a waveform diagram showing a circuit operation as shown in FIG. 12.

DESCRIPTION OF THE PREFERRED EMBODIMENTS

Figure 1:
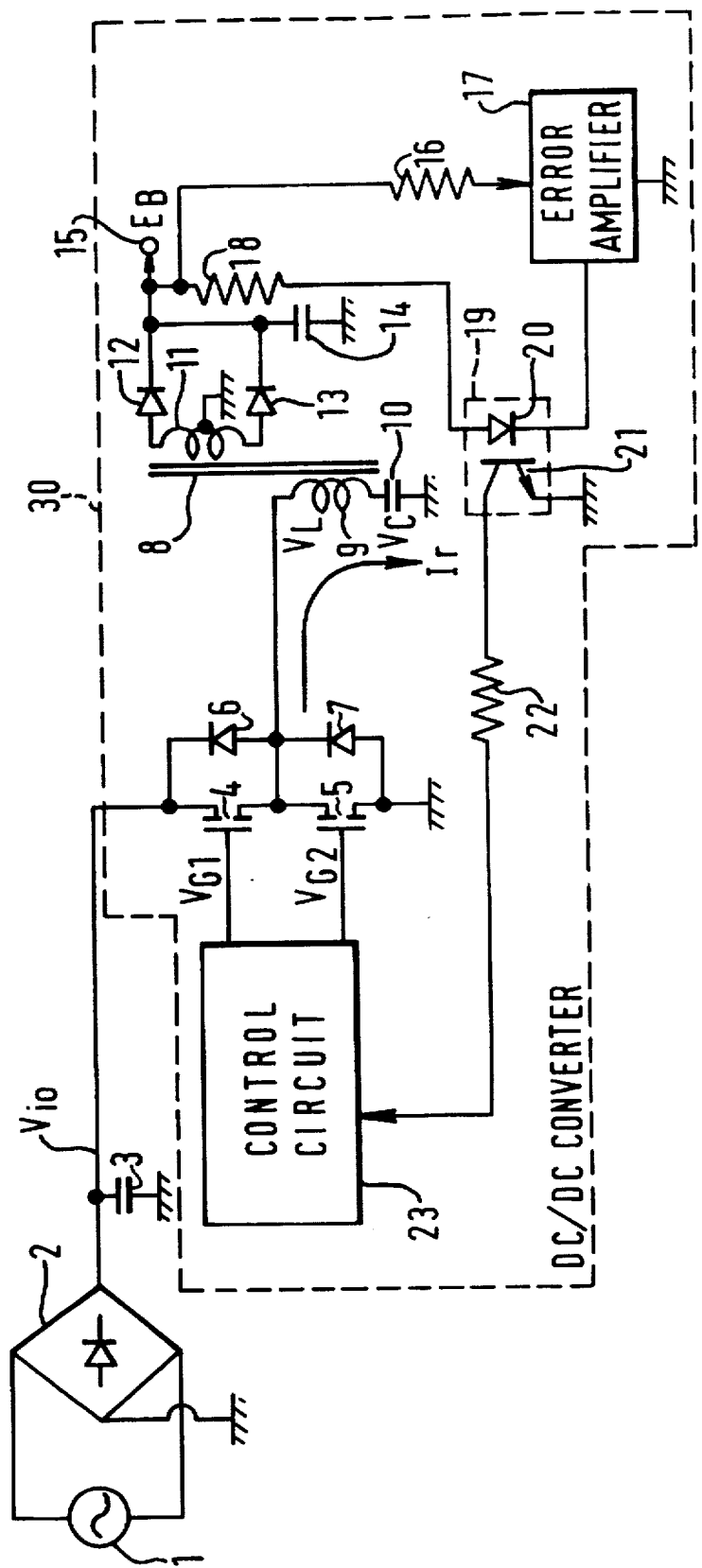
FIG. 1 is a circuit diagram showing a conventional AC/DC converter power circuit.
Figure 3A:
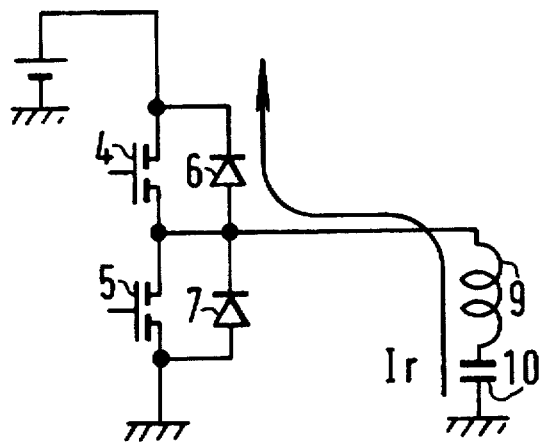
FIG. 3 is a diagram explaining the operation of a circuit which is common to the embodiment of the present invention and the conventional circuit.
Figure 3B:
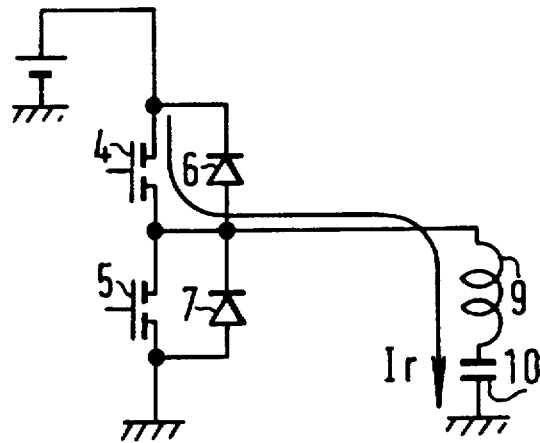
Figure 3C:
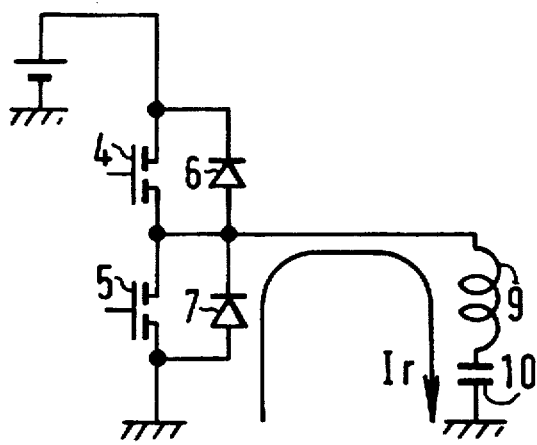
Figure 3D:
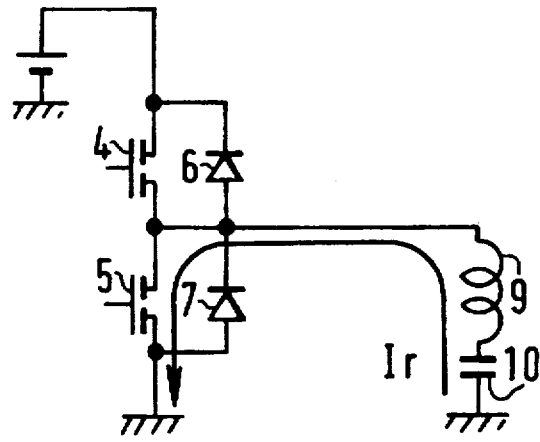

The present invention will be described in detail with reference to the FIGS. 6 through 14. Throughout the drawings, reference numerals or letters in FIGS. 1 through 5 will be used to designate like or equivalent elements for simplicity of explanation.

Figure 6:
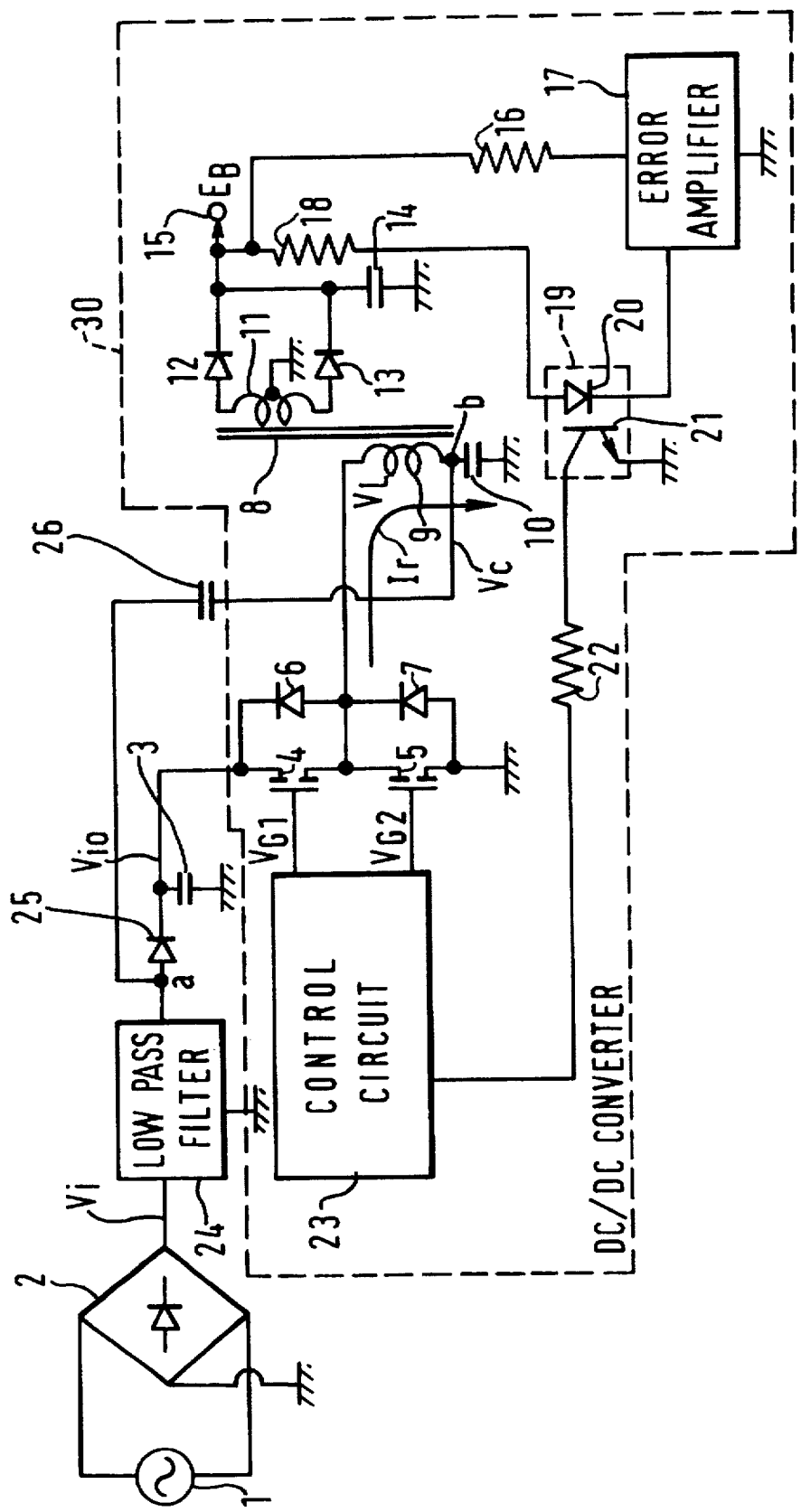
FIG. 6 is a circuit diagram showing an embodiment of the AC/DC converter power circuit according to the present invention.

Referring now to FIG. 6, a first embodiment of the AC/DC converter power circuit according to the present invention will be described in detail. In FIG. 6 the same components as those in FIG. 1 are assigned with the same reference numerals or letters.

In FIG. 6, a low pass filter 24 and a rectifier diode 25 are connected in series between a diode bridge rectifier circuit 2 and a smoothing capacitor 3. A DC decoupling capacitor 26 connects a coupling node a of the low pass filter 24 and the rectifier diode 25 to a coupling node b of a primary winding 9 and a resonant capacitor 10. Other components are the same as those in FIG. 1.

In FIG. 6, the power supply source voltage from a commercial AC power supply source 1 is full-wave rectified in a diode bridge rectifier circuit 2 for output to the coupling node a via the low pass filter 24. The low pass filter 24 (explained later in detail) is provided for decoupling high frequency components which occur in the resonant capacitor 10 in conjunction with the rectification of the sine-wave voltage VC to inhibit the flow of high frequency components into the diode bridge rectifier circuit 2. At the coupling node a, the AC voltage (resonant voltage) across the resonant capacitor 10 is added to the full-wave rectified output voltage from the diode bridge rectifier 2, and the summed voltage is smoothed by a smoothing capacitor 3 to be supplied to the switching means of the DC/DC converter 30. The first rectifier contains the diode bridge rectifier circuit 2, and the second rectifier circuit contains the rectifier diode 25 and the smoothing capacitor 3.

In a DC/DC converter 30, MOSFETs 4, 5 are connected in series between the positive output terminal of the smoothing capacitor 3 and the reference potential source to serve as first and second switching elements, respectively. Further, the first and second diodes 6, 7 are connected in parallel with the MOSFETs 4, 5, respectively, in the reverse bias direction. That is, the cathode and the anode of the diode 6 are connected to the drain and the source of the MOSFET 4, while the cathode and the anode of the diode 7 are connected to the drain and the source of the MOSFET 5, respectively. Gate pulses for turning ON/OFF the MOSFETs 4, 5 are alternately supplied from the control circuit 23 to the gates of the MOSFETs 4, 5. The coupling node between the first parallel circuit of the MOSFET 4 and the diode 6 and the second parallel circuit of the MOSFET 5 and the diode 7 is connected to the reference potential source via a series circuit containing a primary winding 9 and a resonance capacitor 10 for inducing a predetermined AC voltage from the secondary winding 11 of the transformer 8. Generally, the AC voltage, which is boosted according to a turn ratio between the primary winding and the secondary winding of the transformer 8, is output to the secondary winding 11. One end of the secondary winding 11 is connected to a DC voltage output terminal 15 via a rectifier diode 12, and the other end of the secondary winding 11 is connected to the DC voltage output terminal 15 via a rectifier diode 13. The shunt of the secondary winding 11 is connected to the reference potential source. The cathodes of the diodes 12 and 13 are connected together, and a smoothing capacitor 14 is connected between their coupling node and the reference potential source. The third rectifier for full-wave rectifying and then smoothing the AC voltage on the secondary winding 11 of the transformer 8 comprises the rectifier diodes 12 and 13 and the smoothing capacitor 14. A DC voltage EB from the DC voltage output terminal 15 is supplied to an error amplifier 17 via a resistor 16. The DC voltage EB is compared with the reference value and amplified in the error amplifier 17. According to the error voltage output of the error amplifier 17, a current flows into a series circuit of a resistor 18 and a light emitting diode 20. The light emitting diode 20 and a light sensing transistor 21 together form a photo coupler 19, and the error signal flowing to the light emitting diode 20 is transmitted to the light sensing transistor 21 to return as a feedback control signal to the control circuit 23 via a resistor 22. The control circuit 23 for controlling the ON/OFF operation of the first and the second switching elements, (i.e., the MOSFETs 4, 5) alternately changes the frequency of the gate pulse to the MOSFETs 4, 5 using the feedback control signal and controls the ON/OFF cycle of the MOSFETs 4, 5 to stabilize the output voltage EB constantly.

Next, the circuit operation of FIG. 6 will be explained with reference to FIG. 7.

The DC/DC converter 30 carries out the same operation as the DC/DC converter of the conventional circuit in FIG. 1. The gate pulses VG1 and VG2 are supplied to the gates of the MOSFETs 4, 5 according to the timings a, b as shown in FIG. 2. A sine-wave current Ir as shown in FIG. 2-e flows through the primary winding 9 of the transformer 8 and the resonant capacitor 10 during the periods A to D, as shown by the arrows in FIGS. 3-a through 3-d, respectively. As a result, sine-wave voltages VL and VC having waveforms as shown in FIGS. 2-d, 2-c are generated in the primary winding 9 and the resonant capacitor 10. In the secondary side of the transformer 8, a voltage boosted according to the turn ratio in proportion to the sine-wave voltage VL across the primary winding 9 is induced. The induced AC voltage is rectified by the full-wave rectifier containing the rectifier diodes 12, 13, smoothed by the smoothing capacitor 14, and then output as an output DC voltage EB. The output voltage EB is controlled according to the controlling characteristic as shown in FIG. 4 in the same manner as the conventional circuit. The addition of the output voltage EB to the error amplifier 17 changes a switching frequency (operation frequency) of the MOSFETs 4, 5, which operate as switching elements, by returning the error voltage compared and smoothed by the error amplifier 17 via the photo coupler 19 to stabilize the output voltage EB.

Next, the operation of the first and the second rectifier in the AC power supply side will be explained. The sine-wave voltage VC across the resonant capacitor 10 is added to a rectified output voltage Vi (a pulsating current voltage having a frequency as high as the commercial frequency) obtained from the diode bridge rectifier circuit 2 via the DC decoupling capacitor 26. The added voltage is obtained by superimposing the voltage across the resonant capacitor 10 (only its envelope is shown by a dotted line in FIG. 7-a) with the rectifier output voltage; thus, the summed voltage has twice the frequency of the commercial power supply frequency (shown by a solid line), as shown in FIG. 7-a. The summed voltage is added to the anode of the rectifier diode 25 and rectified, and the rectified voltage is smoothed by the smoothing capacitor 3 to be supplied to the DC/DC converter 30 as an input DC voltage. The waveform of the voltage across the resonant capacitor 10 is shown in FIG. 7-b. It shapes a sine-wave according to an LC resonance. The period T of the sine-wave in FIG. 7-b matches the period of the switching frequency f for the MOSFETs 4, 5.

If the sine-wave voltage VC as shown in FIG. 7-b is applied to the anode of the rectifier diode 25 via the DC decoupling capacitor 26, the rectifier diode 25 is turned ON earlier by a time interval Δt1 and turned OFF later by a time interval Δt2 due to the extra sine-wave voltage VC, as compared with the conventional circuit as shown in FIG. 7-c. In other words, the conductive period is extended by the time interval Δt1+Δt2. The rectified current before smoothing (at rectifier diode 25) according to the embodiment of the present invention is shown in FIG. 7-c and the rectified current (the same as FIG. 5-b) before smoothing (at diode bridge rectifier circuit 2) according to the conventional circuit is shown in FIG. 7-d.

As noted above, if the conductive period of the rectified current is extended, the power factor of the power line is increased and the harmonic waves contained in the rectified current is reduced.

The circuit here could be operated without the low pass filter 24 for preventing the high frequency components generated during rectification of the sine-wave voltage VC from reaching the diode bridge rectifier circuit 2. However, without the low pass filter 24, a diode bridge rectifier having an earlier switching characteristic than the conventional circuit will be required, and unwanted spurious emissions (high frequency components) to the AC power supply source 1 may increase.

Figure 8:
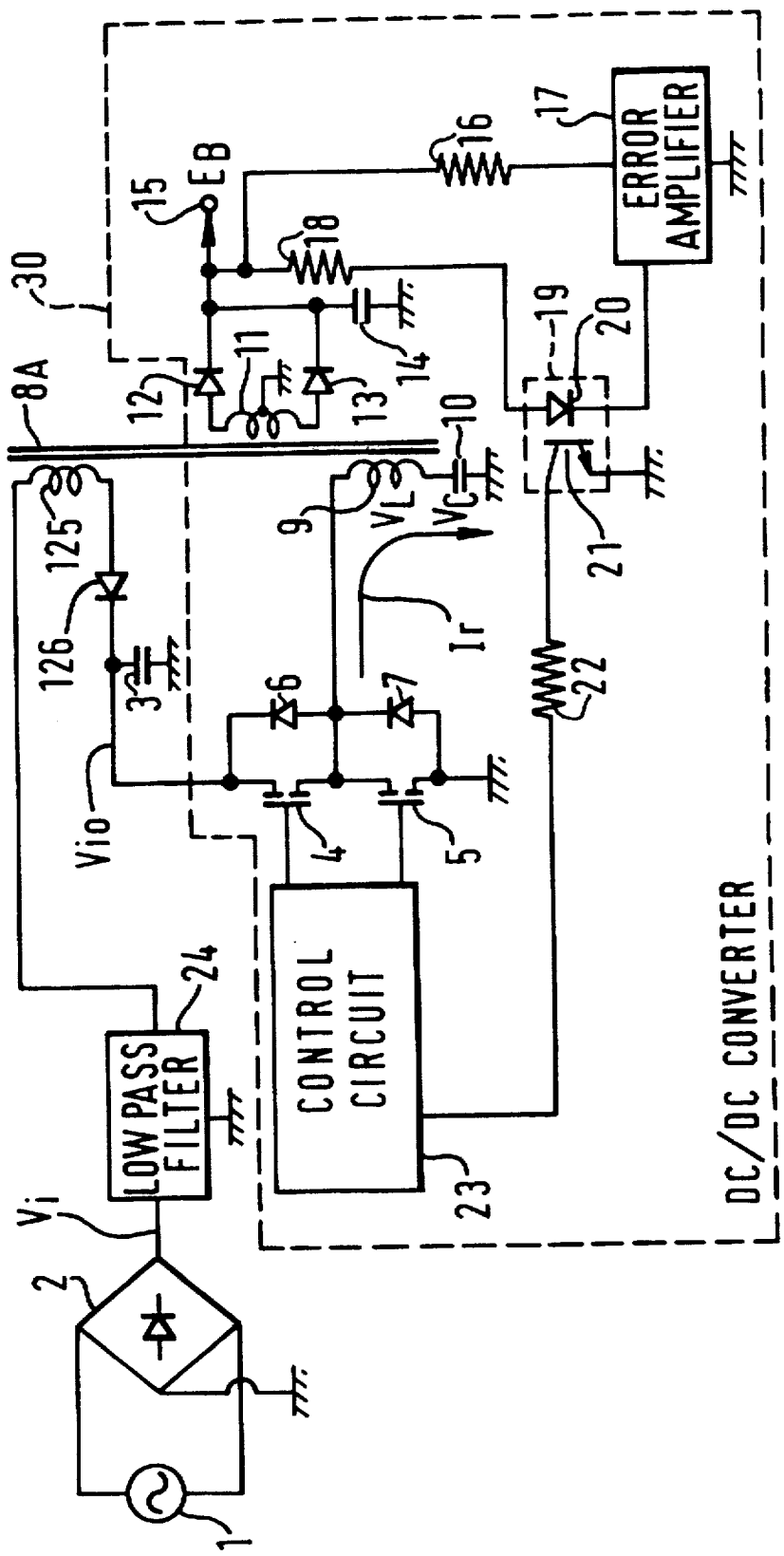
FIG. 8 is a circuit diagram showing a second embodiment of the AC/DC converter power circuit according to the present invention.
Figure 9A:
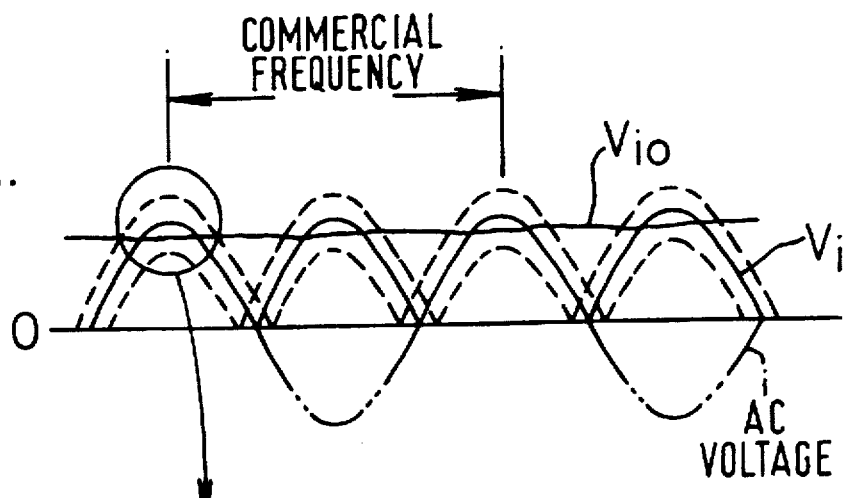
FIG. 9 is a waveform diagram explaining the circuit operation as shown in FIG. 8.
Figure 9B:
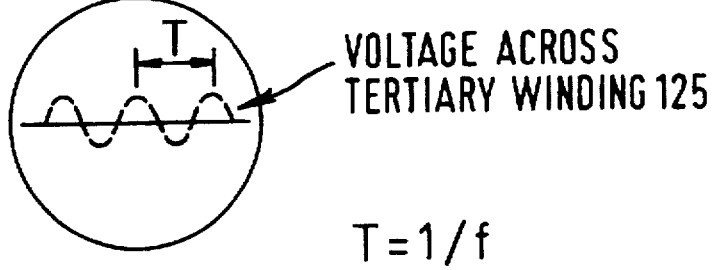
Figure 9C:
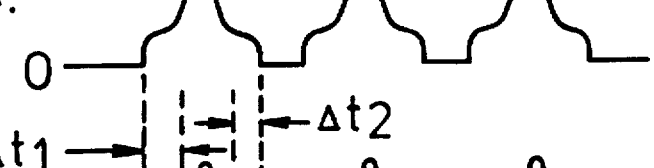
Figure 9D:
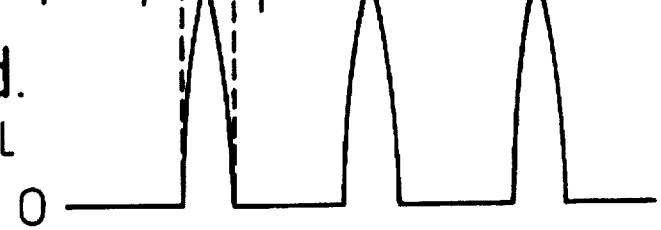

Referring to FIG. 8, a second embodiment of the AC/DC converter power circuit according to the present invention will be described in detail. In FIG. 8, the same components as those in FIG. 1 are assigned with the same reference numerals or letters.

In FIG. 8, a low pass filter 24, a tertiary winding 125 of the transformer 8A and a rectifier diode 126 are connected in series between the diode bridge rectifier circuit 2 and the smoothing capacitor 3 as an addition to the conventional circuit as shown in FIG. 1. The transformer 8A contains a primary winding 9, the secondary winding 11 and the tertiary winding 125. Other components are the same as those in FIG. 1.

In FIG. 8, the power supply voltage from the commercial AC power supply 1 is full-wave rectified in the diode bridge rectifier circuit 2 and then the rectified AC voltage is applied to one end of the tertiary winding 125 of the transformer 8A via the low pass filter 24. The low pass filter 24 (described later in detail) decouples the high frequency components of a sine-wave voltage generated in the tertiary winding 125 to prevent the flow of the high frequency components into the diode bridge rectifier circuit 2. The sine-wave voltage induced from the voltage across the primary winding 9 is also seen across the tertiary winding 125 of the transformer 8A. The sine-wave voltage is added to the full-wave rectified output voltage from the diode bridge rectifier circuit 2, rectified and smoothed by the rectifier diode 126 and the smoothing capacitor 3, and then sent to the switching means of a DC/DC converter.

The DC/DC converter 30 connects MOSFETs 4, 5 (the first and the second switching elements) in series between the output terminal of the positive pole of the smoothing capacitor 3 and the reference potential source. Further, the MOSFETs 4, 5 are connected to the first diode 6 and the second diode 7 in parallel, with the polarity arranged such that the diode current flows in the opposite direction to each switching current of the MOSFETs 4, 5. That is, the cathode and the anode of the diode 6 are connected to the drain and the source of the MOSFET 4, while the cathode and the anode of the diode 7 are connected to the drain and the source of the MOSFET 5, respectively. A gate pulse from the control circuit 23 for turning the MOSFETs 4, 5 ON/OFF is supplied alternately to each gate of the MOSFETs 4, 5. A series circuit containing a primary winding 9 of the transformer 8A and a resonant capacitor 10 is connected between the coupling node of the first parallel circuit, which comprises MOSFET 4 and diode 6, and the second parallel circuit, which comprises MOSFET 5 and diode 7, and the reference potential source to generate a predetermined AC voltage from the secondary winding 11 of the transformer 8A. The first parallel circuit comprising the MOSFET 4 and the diode 6, the series circuit comprising the primary winding 9 and the resonant capacitor 10, and the control circuit together comprise the half-bridge type high frequency inverter for converting the DC voltage into an AC voltage.

Generally, the AC power voltage, which is boosted according to a turn ratio of the primary winding and the secondary winding of the transformer 8A, is output to the secondary winding 11. One end of the secondary winding 11 is connected to an AC voltage output terminal 15 via a rectifier diode 12, and the other end of the secondary winding 11 is connected to the DC voltage output terminal 15 via a rectifier diode 13. The shunt of the secondary winding 11 is connected to the reference potential source. The cathodes of the diodes 12 and 13 are connected together at a coupling node, and a smoothing capacitor 14 is connected between the coupling node and the reference potential source. The secondary winding 11, the rectifier diodes 12 and 13, the ground line connected to the shunt of the secondary winding 11, and the smoothing capacitor 14 together comprise the third rectifier for full-wave rectifying the AC voltage and then smoothing the rectified AC voltage. A DC voltage EB from the DC voltage output terminal 15 is supplied to an error amplifier 17 via a resistor 16. The DC voltage EB is compared with the reference value and amplified in the error amplifier 17. According to the error voltage output of the error amplifier 17, a current flows into a series circuit of a resistor 18 and a light emitting diode 20. The light emitting diode 20 and a light sensing transistor 21 comprise a photo coupler 19, the error signal flowing to the light emitting diode 20 is transmitted to the light sensing transistor 21 to return as a feedback control signal to the control circuit 23 via a resistor 22. The control circuit 23 for controlling the ON/OFF of the first and the second switching elements, (i.e., the MOSFETs 4, 5) alternately changes the frequency of the gate pulse to the MOSFETs 4, 5 by the feedback control signal and controls the ON/OFF cycle of the MOSFETs 4, 5 so as to stabilize the output voltage EB constantly.

Referring now to FIG. 9, the operation of the second embodiment of the AC/DC converter power circuit as shown in FIG. 8 will be described.

The DC/DC converter 30 operates in the same way as the conventional circuit as shown in FIG. 1. Gate pulses VG1 and VG2 are supplied to each gate of MOSFETs 4 and 5 according to the timings as shown in FIGS. 2-a, 2-b. A sine-wave current Ir having a waveform as shown in FIG. 2-e flows to a series circuit of the primary winding 9 of the transformer 8A and the resonant capacitor 10 in each period A to D, as shown in FIGS. 3-a through 3-d. As a result, sine-wave voltages VL and VC having waveforms as shown in FIGS. 2-d, 2-c are generated in the primary winding 9 and the resonant capacitor 10. In the secondary side of the transformer 8A, a voltage proportional to the sine-wave voltage VL across the primary winding 9 is generated according to the turn ratio of the transformer. The voltage is rectified by the full-wave rectifier comprising rectifier diodes 12, 13, smoothed by the smoothing capacitor 14, and then output as an output DC voltage EB. The output voltage EB is controlled according to the controlling characteristic as shown in FIG. 4 in the same manner as the conventional circuit as shown in FIG. 1. The output voltage EB added to the error amplifier 17 changes a switching frequency (operation frequency) of the MOSFETs 4, 5 by returning the error voltage compared and smoothed by the error amplifier 17 via the photo coupler 19 to stabilize the output voltage EB.

Next, the operation of the first and the second rectifiers in the AC input section and the tertiary winding of the transformer 8A will be explained. A rectified output voltage Vi (a pulsating current voltage having twice the frequency as the commercial frequency) obtained from the diode bridge rectifier circuit 2 is supplied to the rectifier diode 126 and the smoothing capacitor 3 via the tertiary winding 125 of the transformer 8A. At this time, the same sine-wave voltage as the sine-wave voltage (resonant voltage) generated in the primary winding 9 of the transformer 8A is also seen in the tertiary winding 125. The same sine-wave voltage is added to the full-wave rectified output voltage Vi from the diode bridge rectifier circuit 2. If the added voltage becomes greater than the voltage generated in the smoothing capacitor 3, the rectifier diode 126 is turned ON by the switching frequency and the smoothing capacitor 3 is charged. At this time, the DC voltage generated in the smoothing capacitor 3 is supplied to the DC/DC converter 30 as an input.

FIG. 9-a shows a voltage obtained by superimposing the voltage across the winding 125 (only its envelope is shown by a dotted line) with the rectified output voltage Vi having a frequency twice as high as the commercial frequency (Vi shown by a solid line). FIG. 9-b shows a waveform of the voltage presenting across the tertiary winding 125. The waveform of the voltage is a sine-wave according to the LC resonance by the primary winding 9 and the resonant capacitor 10. The frequency T of the sine-wave as shown in FIG. 9-b matches the switching frequency f of the MOSFETs 4, 5.

If the sine-wave voltage as shown in FIG. 9-b is applied to the anode of the rectifier diode 126 via the tertiary winding 125, the rectifier diode 126 is turned ON earlier by the time interval $\Delta t1$ and turned OFF later by the time interval $\Delta t2$ due to the extra sine-wave voltage, as compared with the conventional circuit as shown in FIG. 9-c. In other words, the conductive period of the waveform as shown in FIG. 9-c is extended by the time interval $\Delta t1+\Delta t2$, so that the rectifier current waveform is close to an ideal sine-halfwave. The rectified current before smoothing (at rectifier diode 126) according to the embodiment of the present invention is shown in FIG. 9-c and the rectified current (the same as FIG. 5-b) before smoothing (at diode bridge rectifier circuit 2) according to the present invention In the second embodiment of the invention, similarly to the first embodiment, if the conducting period of the rectified current is extended, the power factor of the power line is increased and the harmonic waves contained in the rectified current is reduced.

The circuit here could be operated without the low pass filter 24 for preventing the high frequency components of the sine-wave voltage generated in the tertiary winding 125 from reaching the diode bridge rectifier circuit 2. However, without the low pass filter 24, a diode bridge rectifier circuit 2 having an earlier switching characteristic than a conventional circuit will be required, and unwanted undesired spurious emissions (high frequency components) to the AC power supply 1 may increase.

Figure 10:
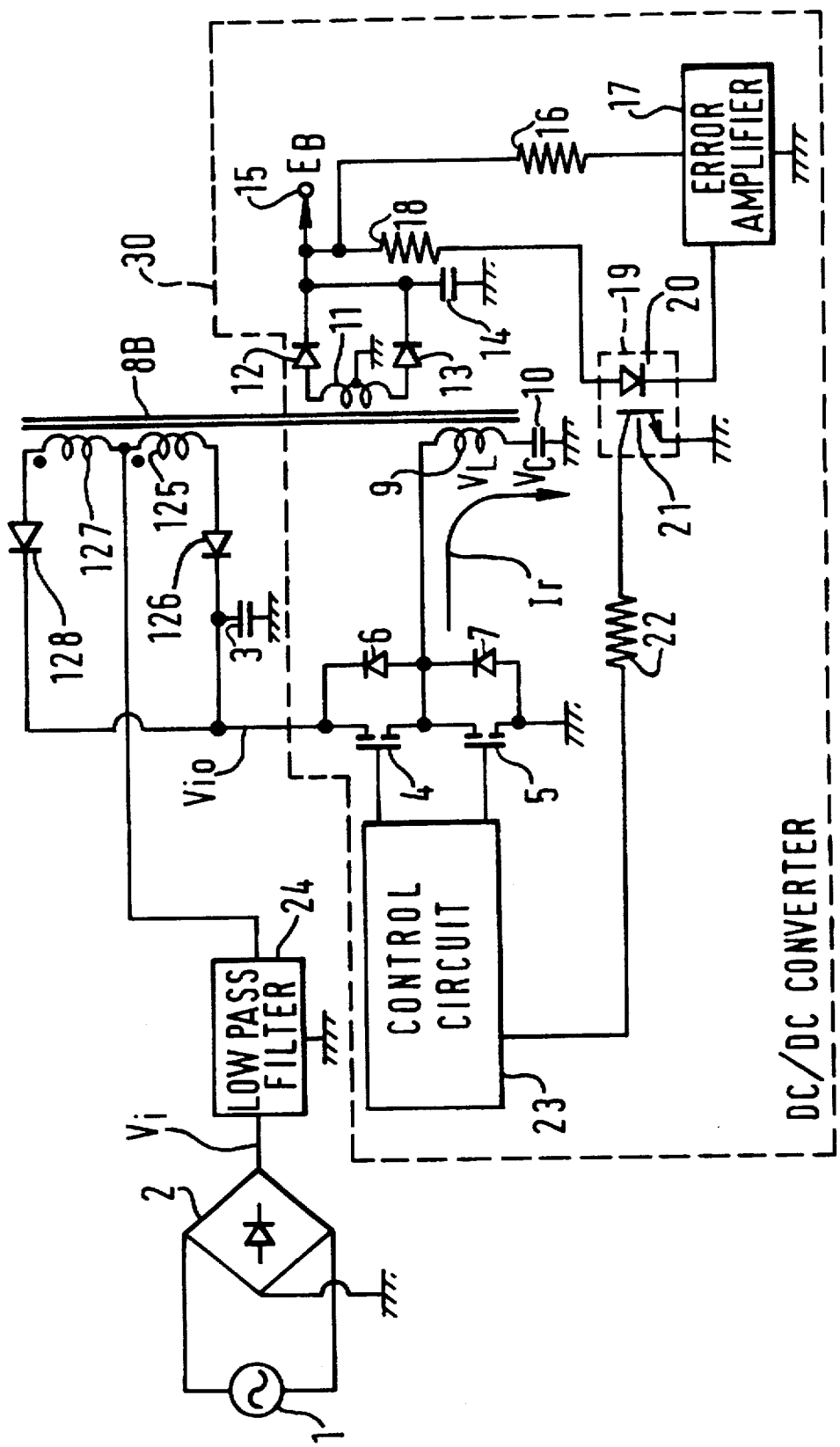
FIG. 10 is a circuit diagram showing a third embodiment of the AC/DC converter power circuit according to the present invention.

Referring now to FIG. 10, a third embodiment of the AC/DC converter power circuit according to the present invention will be described in detail.

In FIG. 10, low pass filter 24, tertiary windings 125 and 127 of the transformer 8B and rectifier diodes 126 and 128 are connected between the diode bridge rectifier circuit 2 and the smoothing capacitor 3 of the conventional circuit shown in FIG. 1. The transformer 8B comprises additional tertiary windings 125 and 127 wound in opposite directions as well as the primary winding 9 and the secondary winding 11. That is, the output terminal of the diode bridge rectifier circuit 2 is connected to the shunt of the tertiary windings 125 and 127, which are wound in opposite directions, in the transformer of the DC/DC converter 30 via the low pass filter 24. The rectifier diode 126 is connected to one end of the tertiary winding 125 so that its anode is faces the tertiary winding 127, and the rectifier diode 128 is connected to one end of the tertiary winding 127 so that its anode faces the tertiary winding 127. The smoothing capacitor 3 is connected to a coupling node coupling the cathodes of the first and the second rectifier diodes 126, 128 and the reference potential source to supply the DC voltage generated in the smoothing capacitor 3 to the switching means of the DC/DC converter 30. Here, the first rectifier comprises the diode bridge rectifier circuit 2, and the second rectifier for full-wave rectifying and smoothing the voltage across the tertiary windings 125 and 127 comprises first and second rectifier diodes 126 and 128 and the smoothing capacitor 3. Since the construction of the DC/DC converter 30 is as same as that in FIG. 8, it will not be explained here.

Referring now to FIG. 11, the operation of the third embodiment of the AC/DC converter power circuit as shown in FIG. 10 will be described.

In FIG. 10, the power supply voltage from the commercial AC power supply source 1 is full-wave rectified by the diode bridge rectifier circuit 2 and then applied to the shunt of the tertiary windings 125 and 127 of the transformer 8B via the low pass filter 24. The low pass filter 24 (described later in detail) is for decoupling the high frequency components of the sine-wave voltage generated in the tertiary windings 125 and 127 to prevent the flow of high frequency components to the diode bridge rectifier circuit 2. Sine-wave voltages having opposite phases (shifted 180 degrees from each other) induced based on the voltage (resonant voltage) across the primary winding 9 occur across the tertiary windings 125 and 127 of the transformer 8B. The sine-wave voltages are added to the full-wave rectified output voltage Vi from the diode bridge rectifier circuit 2. If the summed voltage exceeds the voltage generated in the smoothing capacitor 3, the rectifier diode 126 and the rectifier diode 128 are alternately turned ON for every half cycle period and charged to the smoothing capacitor 3. At this time, the DC voltage generated in the smoothing capacitor 3 is input to the DC/DC converter 30. In the tertiary windings 125 and 127, the same sine-wave voltages as the voltage VL are generated in the primary winding 9 (see FIG. 2) at amplitudes defined by the number of winding turns in the tertiary windings 125 and 127 and the 180 degree phase difference therebetween. The voltages are added to the original rectified output voltage Vi (a pulsating current having twice the frequency as the commercial power supply source frequency) of the diode bridge rectifier circuit 2, rectified by the rectifier diodes 126 and 128 of the second rectifier, and smoothed by the smoothing capacitor 3 to supply to the input DC voltage of the DC/DC converter.

FIG. 11-a shows a voltage which is obtained by adding the voltages across the tertiary windings 125 and 127 (envelopes of both voltages are shown by a dotted line) with the rectified output voltage Vi having twice the frequency as the commercial frequency (Vi shown by a solid line). FIG. 11-b shows the waveforms of the voltage across the tertiary windings 125 and 127. These waveforms are sine-waves according to the LC resonance by the primary winding 9 and the resonant capacitor 10. The frequency T of the sine-wave as shown in FIG. 11-b matches the switching frequency f of the MOSFETs 4, 5.

If the opposite phase sine-wave voltages shown in FIG. 11-b are applied to the anodes of the rectifier diodes 126 and 128 via the tertiary windings 125 and 127, the rectifier diodes 126 and 128 are turned ON earlier by the time interval Δt11 and turned OFF later by the time interval Δt11, as compared with the conventional circuit, due to the extra sine-wave voltage, as shown in FIG. 11-c. In other words, the conductive period of the waveform as shown in FIG. 11-c is extended by the time interval Δt11+Δt12, so that the rectified current waveform is closer to being an ideal sine-halfwave. The rectified current, before being smoothed (after being rectified by the rectifier diodes 126 and 128) by this embodiment of the present invention is shown in FIG. 11-c, and the rectified current before being smoothed (after being rectified by the diode bridge rectifier circuit 2) by a conventional circuit is shown in FIG. 11-d. According to this embodiment of the present invention, since the AC voltages having opposite phases induced in the windings 125 and 127 are superimposed, it is possible to increase the power factor more than the circuit shown in FIG. 8 and to reduce the harmonic waves contained in the rectified current.

Since the operation of the DC/DC converter 30 is the same as that of the circuit as shown in FIG. 8, it will not be explained here.

Similar to the embodiments described above, if the conducting period of the rectified current is extended, the power factor of the power line increases and the harmonic waves contained in rectified current decrease.

The circuit can be operated without the low pass filter 24 for decoupling the high frequency components generated in the tertiary windings 125 and 127 to prevent them from reaching the diode bridge rectifier circuit 2. However, without the low pass filter 24, a diode bridge rectifier having a earlier switching characteristic than the conventional circuit will be required, and undesired spurious emissions (high frequency components) to the AC power supply 1 may increase.

Figure 12:
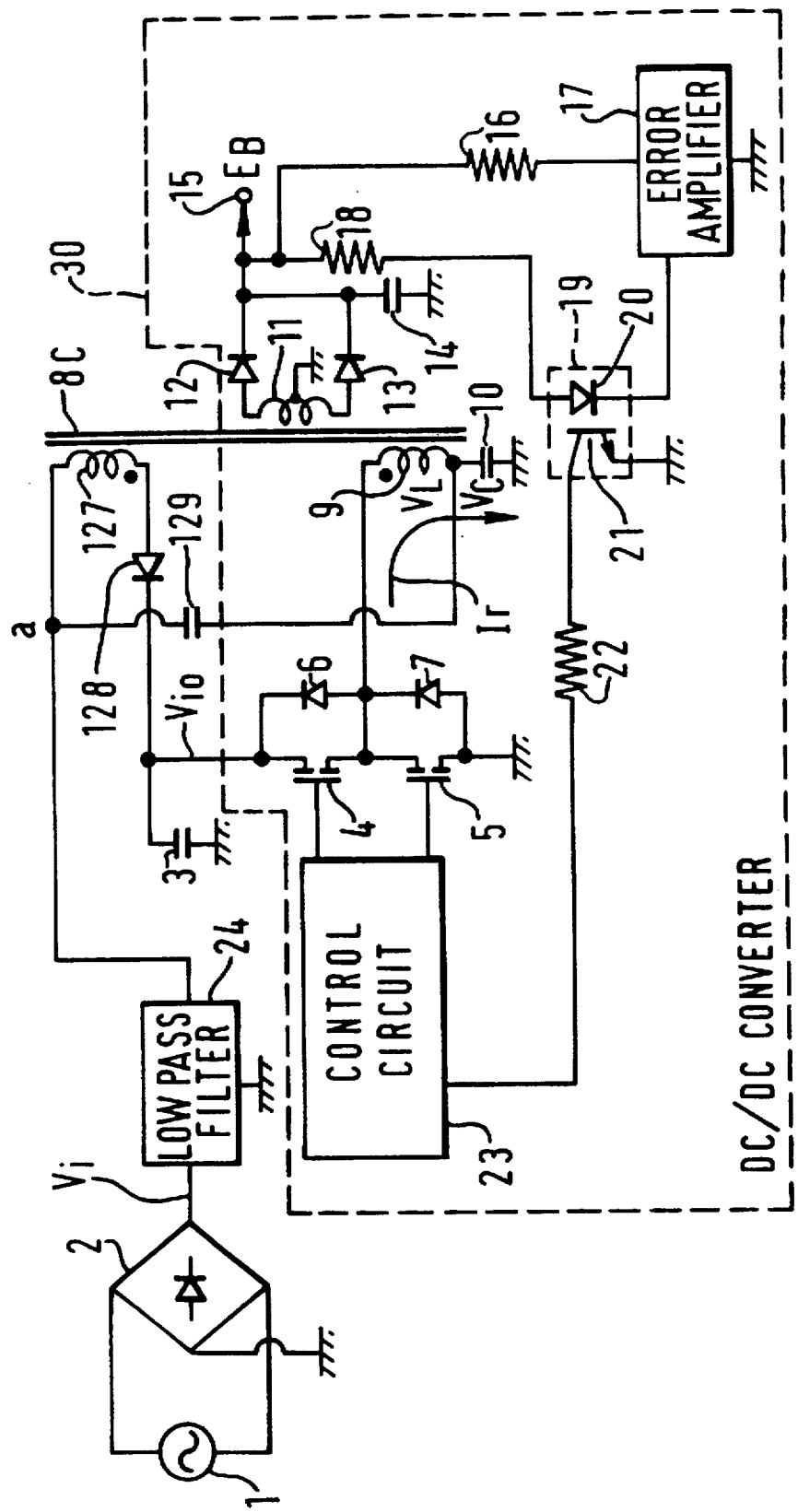
FIG. 12 is a circuit diagram showing a fourth embodiment of the AC/DC converter power circuit according to the present invention.

Referring now to FIG. 12, a fourth embodiment of the AC/DC converter power circuit according to the present invention will be described in detail.

In FIG. 12, the low pass filter 24, the tertiary winding 127 of the transformer 8C, and the rectifier diode 128 are connected between the diode bridge rectifier circuit 2 and the smoothing capacitor 3 like the conventional circuit as shown in FIG. 1. The transformer 8B comprises the tertiary winding 127 wound the opposite direction as a primary winding 9, the primary winding 9 itself, and the secondary winding 11. The voltage generated in the coupling node of the primary winding 9 and the resonant capacitor 10 is supplied to output terminal a of the low pass filter 24 via the DC decoupling capacitor 129. That is, the output terminal of the diode bridge rectifier circuit 2 is connected to one end of the tertiary winding 127 via the low pass filter 24, and the other end of the tertiary winding 127 is connected to the rectifier diode 128 in the second rectifier comprising the rectifier diode 128 and the smoothing capacitor 3. The coupling node of the primary winding 9 and the resonant capacitor 10 is connected to one end of the tertiary winding 127 via the DC blocking capacitor 129. The sine-wave voltage generated in the tertiary winding 127 and the sine-wave voltage of the resonant capacitor 10 have the same phase. The sine-wave voltages are added to the rectified output voltage Vi from the diode bridge rectifier circuit 2 and supplied to the second rectifier circuit so that the rectified and smoothed DC voltage is supplied to the switching means of the DC/DC converter 30. Since the construction of the DC/DC converter 30 is as same as that in FIG. 8, it will not be explained here.

Referring now to FIG. 13, the operation of the fourth embodiment of the AC/DC converter power circuit as shown in FIG. 12 will be described.

In FIG. 12, the power supply voltage from the commercial AC power supply source 1 is full-wave rectified by the diode bridge rectifier circuit 2 and then applied to one end of the tertiary winding 127 of the transformer 8C via the low pass filter 24. The low pass filter (explained later in detail) is for decoupling the high frequency components of the sine-wave voltage generated in the tertiary winding 127 to prevent the flow of the high frequency components to the diode bridge rectifier circuit 2. The sine-wave voltage induced from the voltage (resonant voltage) across the primary winding 9 occurs across the tertiary winding 127 of the transformer 8C. Since the tertiary winding 127 is wound in the opposite direction as the primary winding 9, a voltage which is proportional to the voltage -VL and having a phase opposite to the sine-wave voltage VL generated in the primary winding 9, in other words, a sine-wave voltage having the same phase as the voltage VC generated in the resonant capacitor 10, is generated in the tertiary winding 127 (see FIG. 2). Therefore, the sine-wave voltage generated in the tertiary winding 127 is added to the rectified output voltage Vi at a point a, and the sine-wave voltage of the resonant capacitor 10 having the same phase as the sine-wave voltage of the tertiary winding 127 is also added. The summed voltage is supplied to the smoothing capacitor 3 via the rectifier diode 128. However, if the summed voltage exceeds the voltage across the smoothing capacitor, the rectifier diode 128 is turned ON by a switching period and the smoothing capacitor is charged so that the DC voltage generated in the smoothing capacitor 3 is supplied to the DC/DC converter 30 as an input. In the embodiment according to the present invention as described above, since the two sine-wave voltages of the switching frequency are added to the rectified output voltage Vi of the bridge rectifier diode circuit 2 in the same phases, the summed sine-wave voltage amplitude is larger than in the embodiment in FIG. 8, increasing the power factor and reducing the harmonic waves contained in the rectified current compared with the embodiment in FIG. 8.

FIG. 13-a shows a voltage which is obtained by adding the voltage across the resonant capacitor 10 and the voltage across the winding 127 (the envelopes of both voltages are shown by a dotted line) to the rectified output voltage having twice the frequency as the commercial frequency (Vi shown by a solid line). FIG. 13-b shows the waveform of the voltage which is obtained by adding the voltage across the resonant capacitor 10 with the voltage across the winding 127 in the same phase. This waveform is a sine-wave according to the LC resonance by the primary winding 9 and the capacitor 10. The frequency T of the sine-wave, as shown in FIG. 13-b, matches the switching frequency f of the MOSFETs 4, 5.

If the sine-wave voltage as shown in FIG. 13-b is applied to the rectifier diode 128 via the tertiary winding 127, the rectifier diode 128 is turned ON earlier by time interval $\Delta t21$ and turned OFF later by time interval $\Delta t22$ as compared with the conventional circuit due to the extra sine-wave voltage, as shown in FIG. 13-c. In other words, the conducting period of the waveform as shown in FIG. 13-c is extended by the time interval $A\Delta t21+\Delta t22$, as compared with the conventional circuit as shown in FIG. 13-d, so that the rectified current waveform is close to being an ideal half wave of the sine-wave. The rectified current before being smoothed (after being rectified by the rectifier diode 128) according to the embodiment of the present invention is shown in FIG. 13-c, and the rectified current (the same as FIG. 5-b) before being smoothed (after rectified by the diode bridge rectifier circuit 2) according to the conventional circuit is shown in FIG. 13-d. Therefore, in the embodiment of the present invention, since the two sine-wave voltages of the switching frequency are added to the rectified output voltage Vi of the diode bridge rectifier circuit 2 in the same phases, the summed amount (the added amplitudes of the sine-wave voltages) is larger than the amplitude of the voltage used in the embodiment in FIG. 8, and thus the power factor can increase more than in the embodiment in FIG. 8.

Since the operation of the DC/DC converter 30 is same as that of the circuit in FIG. 8, it will not be explained here.

Similar to the embodiment mentioned above, if the conducting period of the rectified current is extended, the power factor of the power line increases, and the harmonic waves contained in the rectified current is reduced.

The circuit can be operated without the low pass filter 24 for decoupling the high frequency components generated in the tertiary windings 125 and 127 to prevent them from reaching the diode bridge rectifier circuit 2. However, without the low pass filter 24, a diode bridge rectifier having a earlier switching characteristic than a conventional circuit will be required, and unwanted spurious emissions (high frequency components) to the AC power supply 1 may increase.

Figure 14:
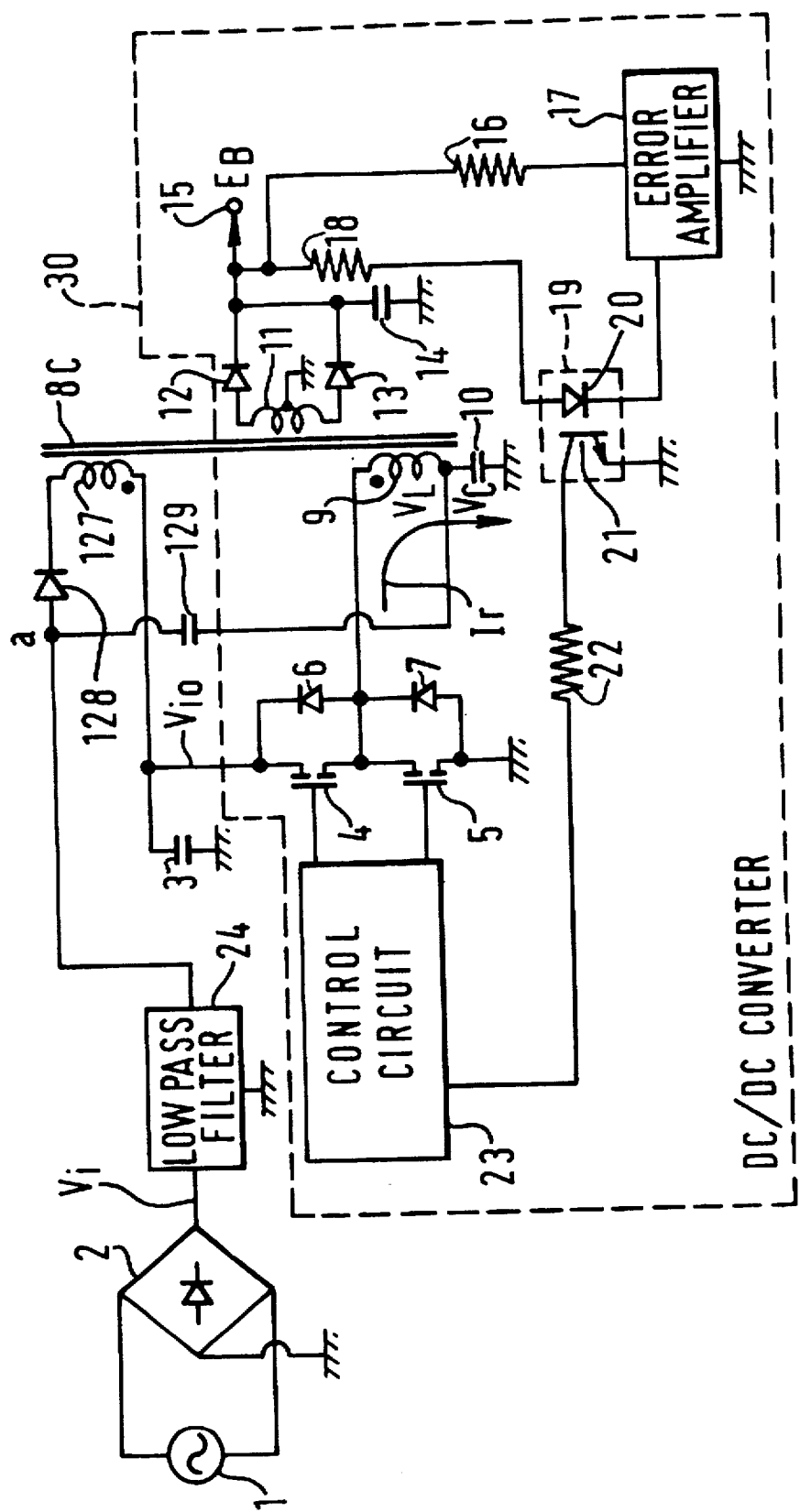
FIG. 14 is a circuit diagram showing a fifth embodiment of the AC/DC converter power circuit according to the present invention.

Referring now to FIG. 14, a fifth embodiment of the AC/DC converter power circuit according to the present invention will be described in detail.

In the embodiment as shown in FIG. 12, the rectifier diode 128 is provided for the hot terminal side of the tertiary winding 127 so that its anode faces the tertiary winding. However, in the embodiment of the present invention as shown in FIG. 14, the rectifier diode 128 is provided at the input of the tertiary winding 127 so that its cathode is coupled to the tertiary winding while its anode is coupled to the coupling node a. In the arrangement as shown in FIG. 14, the same rectified output waveform and the rectified current waveform as shown in FIG. 13-a through 13-c are obtained and the same operation and effect as the embodiment as shown in FIG. 12 are also obtained.

According to the present invention as described above, by adding a few parts to a conventional circuit, it is possible to increase the power factor of the power line and reduce the harmonic waves contained in the rectified current.

As described above, the present invention can provide an extremely preferable AC/DC converter power supply circuit.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. An AC/DC converter power supply circuit, comprising:
   an AC power supply source for generating a source voltage;
   a first rectifier for full-wave rectifying the AC power supply source voltage;
   a second rectifier for further rectifying and smoothing the voltage rectified by the first rectifier;
   a DC/DC converter for obtaining a desired rectified and smoothed DC voltage after converting the voltage rectified and smoothed in the second rectifier into a second AC voltage by a high frequency inverter; and
   means for adding the second AC voltage generated by the high frequency inverter in the DC/DC converter to the first rectifier voltage from the first rectifier circuit.

2. The AC/DC converter power supply circuit as claimed in claim 1, wherein the DC/DC converter comprises:

a first parallel circuit containing a first diode connected in parallel with a first switching element and having a polarity where a diode current flows in the opposite direction to a switching current of the first switching element, and a DC voltage from the second rectifier is supplied to the coupling node of the first switching element and the cathode of the first diode;

a second parallel circuit containing a second diode connected in parallel with a second switching element and having a polarity where a diode current flows in the opposite direction to a switching current of the second switching element, the coupling node of the second switching element and the cathode of the second diode being connected to the coupling node of the first switching element and the anode of the first diode, and the coupling node of the second switching element and the anode of the second diode being connected to a reference potential source;

a transformer having a primary winding connected between the coupling node of the first and second parallel circuits and the reference potential source through a resonant capacitor and a secondary winding for inducing a predetermined AC voltage;

a third rectifier for rectifying the AC voltage generated in the secondary winding of the transformer and for smoothing the rectified voltage obtained from the third rectifier; and a control circuit for alternately turning ON/OFF the first switching element and the second switching element.

3. An AC/DC converter power supply circuit as claimed in claim 1, wherein the first rectifier comprises a diode bridge rectifier circuit and the second rectifier comprises a rectifier diode and a smoothing capacitor.

4. An AC/DC converter power supply circuit as claimed in claim 1, wherein the adding means is constituted by using a DC decoupling capacitor.

5. An AC/DC converter power supply circuit as claimed in claim 2, wherein the control circuit changes the ON and OFF cycle of the first and second switching elements based on the voltage from which the rectified and smoothed voltage from the third rectifier is detected, and control of the voltage from the third rectifier is constant.

6. An AC/DC converter power supply circuit, comprising;

an AC power supply source for generating a source voltage;

a diode bridge rectifier circuit to which the AC power supply source voltage is supplied;

a low pass filter connected to the output of the diode bridge rectifier;

a rectifier diode connected by its anode to the output of the low pass filter;

a smoothing capacitor connected between the cathode of the rectifier diode and the reference potential source;

a DC/DC converter for obtaining a desired rectified and smoothed DC voltage after converting the DC voltage smoothed by the smoothing capacitor into a second AC voltage by a high frequency inverter; and a DC decoupling capacitor for supplying the second AC voltage generated by the high frequency inverter of the DC/DC converter to the rectifier diode.

7. An AC/DC converter power supply circuit, comprising:

an AC power supply source for generating a source voltage;

a first rectifier for full-wave rectifying the AC power supply source voltage;

a second rectifier for further rectifying and smoothing the voltage rectified by the first rectifier;

a DC/DC converter for obtaining a desired rectified and smoothed DC voltage after changing the DC voltage rectified and smoothed by the second rectifier into a second AC voltage using a high frequency inverter, and for changing the second AC voltage into a desired voltage using a transformer; and a winding connected between the first rectifier and the second rectifier and wound in the transformer of the DC/DC converter for adding a voltage induced by the second AC voltage of the high frequency inverter to a full-wave rectifier voltage from the first rectifier circuit to supply an added voltage to the second rectifier.

8. An AC/DC converter power supply circuit, comprising:

an AC power supply source for generating a source voltage;

a first rectifier for full-wave rectifying the AC power supply source voltage;

a second rectifier for further rectifying and smoothing the voltage rectified by the first rectifier;

a DC/DC converter for obtaining a desired rectified and smoothed DC voltage after changing the DC voltage rectified and smoothed by the second rectifier into a second AC voltage using a high frequency inverter, and for changing the second AC voltage into a desired voltage using a transformer; and first and second windings connected between the first rectifier and the second rectifier and wound in opposite phase directions in the transformer of the DC/DC converter for adding opposite phase AC voltages induced in the first and second windings based on the AC voltage of the high frequency inverter to a full-wave rectifier voltage from the first rectifier to supply an added voltage to a full-wave rectifier input terminal of the second rectifier.

9. An AC/DC converter power supply circuit, comprising:

an AC power supply source for generating a source voltage;

a first rectifier for full-wave rectifying the AC power supply source voltage;

a second rectifier for further rectifying and smoothing the voltage rectified by the first rectifier;

a DC/DC converter for obtaining a desired rectified and smoothed DC voltage after changing the DC voltage rectified and smoothed by the second rectifier circuit into a second AC voltage using a high frequency inverter, and for changing the second AC voltage into a desired voltage using a transformer;

a first adder containing a winding connected between the first rectifier and the second rectifier and wound in the transformer of the DC/DC converter for adding the voltage induced in the winding based on the AC voltage of the high frequency inverter to the full-wave rectifier voltage from the first rectifier to obtain an added voltage; and a second adder for adding the AC voltage generated in the high frequency inverter of the DC/DC converter to the full-wave rectifier voltage from the first rectifier so that the phase of the AC voltage becomes the same as the phase of the added voltage in the first adder.

10. An AC/DC converter power supply circuit, comprising:

an AC power supply source for generating a source voltage;

a first rectifier for full-wave rectifying the AC power supply source voltage;

a second rectifier for further rectifying and smoothing the voltage rectified by the first rectifier;

a smoothing circuit for smoothing the voltage of the second rectifier circuit;

a DC/DC converter for obtaining a desired rectified and smoothed DC voltage after changing the DC voltage rectified and smoothed by the second rectifier circuit into a second AC voltage using a high frequency inverter, and for changing the second AC voltage into a desired voltage using a transformer;

a first adder containing a winding connected between the second rectifier and the smoothing circuit and wound in the transformer of the DC/DC converter for adding the voltage induced in the winding based on the AC voltage of the high frequency inverter to the rectifier voltage from the second rectifier to obtain an added voltage; and a second adder for adding the AC voltage generated in the high frequency inverter of the DC/DC converter to a full-wave rectifier voltage from the first rectifier so that the phase of the AC voltage becomes the same as the phase of the added voltage in the first adder.

11. An AC/DC converter power supply circuit as claimed in one of claims 7 through 10, wherein the DC/DC converter comprises:

a first parallel circuit containing a first diode connected in parallel with a first switching element and having a polarity where a diode current flows in the opposite direction to a switching current of the first switching element, and wherein a DC voltage from the second rectifier is supplied to the coupling node of the first switching element and the cathode of the first diode;

a second parallel circuit containing a second diode connected in parallel with a second switching element and having a polarity where a diode current flows in the opposite direction to a switching current of the second switching element, wherein the coupling node of the second switching element and the cathode of the second diode is connected to the coupling node of the first switching element and the anode of the first diode, and the coupling node of the second switching element and the anode of the second diode is connected to a reference potential source;

a transformer connected between the coupling node of the first and second parallel circuits and the reference potential source for outputting a specified AC voltage to a secondary winding coupled with a series circuit containing a primary winding and a resonant capacitor;

a third rectifier for rectifying the AC voltage generated in the secondary winding of the transformer to obtain a third rectified voltage and for smoothing the third rectified voltage; and a control circuit for alternately turning ON/OFF the first switching element and the second switching element.

12. An AC/DC converter power supply circuit as claimed in one of claims 7 through 9, wherein the first rectifier is comprises a diode bridge rectifier circuit, and the second rectifier comprises a rectifier diode and a smoothing capacitor.

13. An AC/DC converter power supply circuit as claimed in claim 10, wherein the first rectifier comprises a diode bridge rectifier circuit, and the second rectifier comprises a rectifier diode.

14. An AC/DC converter power supply circuit as claimed in claims 9 or 10 wherein the second adder is constituted by using a DC decoupling capacitor.

15. An AC/DC converter power supply circuit as claimed in claim 11, wherein the control circuit changes the ON/OFF cycle of the first and the second switching elements according to the voltage from which the DC voltage from the third rectifier is detected, and controls the DC voltage from the third rectifier constantly.

16. An AC/DC converter power supply circuit as claimed in one of claims 7 through 10, further comprising a low pass filter between the first rectifier and the input terminal of the winding to the transformer for decoupling the high frequency components to prevent the high frequency components from flowing into the first rectifier.

17. An AC/DC converter power supply circuit as claimed in one of claims 10 or 13, further comprising a low pass filter between the first rectifier and the second rectifier for decoupling the high frequency components to prevent the high frequency components from flowing into the first rectifier.

* * * * *